(12) United States Patent
Kim

(10) Patent No.: US 11,811,963 B2
(45) Date of Patent: Nov. 7, 2023

(54) ELECTRONIC APPARATUS AND METHOD OF SELECTIVELY APPLYING SECURITY MODE IN MOBILE DEVICE

(71) Applicant: Seungman Kim, McLean, VA (US)

(72) Inventor: Seungman Kim, McLean, VA (US)

(*) Notice: Subject to any disclaimer, the term of this patent is extended or adjusted under 35 U.S.C. 154(b) by 0 days.

(21) Appl. No.: 18/113,555

(22) Filed: Feb. 23, 2023

(65) Prior Publication Data

US 2023/0199104 A1 Jun. 22, 2023

Related U.S. Application Data

(60) Division of application No. 17/524,872, filed on Nov. 12, 2021, now Pat. No. 11,595,507, which is a (Continued)

(51) Int. Cl.
*H04M 1/67* (2006.01)
*H04M 1/673* (2006.01)
(Continued)

(52) U.S. Cl.
CPC ......... *H04M 1/72412* (2021.01); *H04M 1/67* (2013.01); *H04M 1/673* (2013.01); *H04M 1/72448* (2021.01); *H04M 1/72463* (2021.01); *H04M 1/72469* (2021.01); *H04M 1/724631* (2022.02); *H04W 12/06* (2013.01); *H04W 12/08* (2013.01); *H04W 52/0251* (2013.01); *H04W 52/0274* (2013.01); *H04M 1/66* (2013.01); *H04M 1/72451* (2021.01); *H04M 1/72457* (2021.01); *Y02D 30/70* (2020.08)

(58) Field of Classification Search
None
See application file for complete search history.

(56) References Cited

U.S. PATENT DOCUMENTS 5,731,801 A 3/1998 Fukuzaki
7,400,878 B2 7/2008 Hassan et al.
(Continued)

FOREIGN PATENT DOCUMENTS

EP 2364004 A1 9/2011
KR 1020110049368 5/2011
(Continued)

OTHER PUBLICATIONS https://manuals.info.apple.com/MANUALS/1000/MA1658/en_US/iphone_ios6_user_guide.pdf.
(Continued)

*Primary Examiner* — Idowu O Osifade
(74) *Attorney, Agent, or Firm* — Seungman Kim; EIPG

(57) ABSTRACT

A mobile device includes a user interface including a display panel to display a menu image and a touch panel to receive a password, a network interface to detect an external device, a functional unit to sense a motion of the mobile device and to photograph a user, and a control unit to control the user interface, the network interface, the memory, and the functional unit, to unlock the mobile device according to a user identification process of identifying an authorized user, when the mobile device is in a time condition, in response to the sensed motion, and to unlock the mobile device according to the password when the mobile device is not in the time condition, in response to the sensed motion.

20 Claims, 16 Drawing Sheets

Related U.S. Application Data division of application No. 16/581,558, filed on Sep. 24, 2019, now Pat. No. 11,184,473, which is a division of application No. 16/402,275, filed on May 3, 2019, now Pat. No. 10,511,975, which is a division of application No. 16/166,078, filed on Oct. 20, 2018, now Pat. No. 10,299,133, which is a division of application No. 16/127,286, filed on Sep. 11, 2018, now Pat. No. 10,149,164, which is a continuation of application No. 15/984,375, filed on May 20, 2018, now Pat. No. 10,085,151, which is a continuation of application No. 15/972,135, filed on May 5, 2018, now Pat. No. 10,111,098, which is a division of application No. 15/853,870, filed on Dec. 25, 2017, now Pat. No. 9,973,929, which is a continuation of application No. 15/297,069, filed on Oct. 18, 2016, now Pat. No. 10,064,056, which is a continuation-in-part of application No. 14/181,728, filed on Feb. 17, 2014, now Pat. No. 9,509,822.

(51) Int. Cl.
| | |
|---|---|
| *H04W 52/02* | (2009.01) |
| *H04W 12/06* | (2021.01) |
| *H04W 12/08* | (2021.01) |
| *H04M 1/72412* | (2021.01) |
| *H04M 1/72448* | (2021.01) |
| *H04M 1/72469* | (2021.01) |
| *H04M 1/72463* | (2021.01) |
| *H04M 1/66* | (2006.01) |
| *H04M 1/72451* | (2021.01) |
| *H04M 1/72457* | (2021.01) |

(56) References Cited

U.S. PATENT DOCUMENTS

| | | |
|---|---|---|
| 8,233,789 B2 | 7/2012 | Brunner |
| 8,245,143 B2 | 8/2012 | Yach et al. |
| 8,276,085 B2 | 9/2012 | Sherwani |
| 8,279,184 B2 | 10/2012 | Lowles et al. |
| 8,280,363 B2 | 10/2012 | Yoo |
| 8,284,179 B2 | 10/2012 | Bernstein |
| 8,284,211 B2 | 10/2012 | Darsa et al. |
| 8,302,033 B2 | 10/2012 | Matas et al. |
| 8,358,321 B1 | 1/2013 | Weidner |
| 8,600,056 B2 | 12/2013 | Heurtaux et al. |
| 8,600,060 B2 | 12/2013 | Priestley et al. |
| 8,600,120 B2 | 12/2013 | Gonion et al. |
| 8,613,070 B1 | 12/2013 | Borzycki et al. |
| 8,626,125 B2 | 1/2014 | Lee et al. |
| 8,627,433 B2 | 1/2014 | Conner et al. |
| 8,627,438 B1 | 1/2014 | Bhimanaik |
| 8,646,069 B2 | 2/2014 | Kim et al. |
| 8,649,759 B2 | 2/2014 | Scott et al. |
| 8,665,238 B1 | 3/2014 | Gossweiler et al. |
| 8,751,065 B1 | 6/2014 | Kato |
| 8,826,178 B1 | 9/2014 | Zhang |
| 8,994,499 B2 | 3/2015 | Zhao et al. |
| 9,076,029 B2 | 7/2015 | Free |
| 9,230,158 B1 | 1/2016 | Ramaswamy et al. |
| 2003/0073448 A1 | 4/2003 | Ozeki et al. |
| 2004/0203895 A1 | 10/2004 | Balasuriya |
| 2005/0073388 A1 | 4/2005 | Lee et al. |
| 2006/0128305 A1 | 6/2006 | Delalat |
| 2006/0242434 A1 | 10/2006 | Lee |
| 2007/0197261 A1* | 8/2007 | Humbel ............ G07C 9/00309 455/558 |
| 2007/0271512 A1 | 11/2007 | Knight et al. |
| 2007/0277230 A1 | 11/2007 | Hawkins et al. |
| 2008/0070503 A1 | 3/2008 | Bang |
| 2008/0262839 A1 | 10/2008 | Nonaka et al. |
| 2008/0307360 A1 | 12/2008 | Chaudhri |
| 2009/0011796 A1 | 1/2009 | Ormson |
| 2009/0160792 A1 | 6/2009 | Morohoshi et al. |
| 2009/0267912 A1 | 10/2009 | Wada |
| 2009/0271704 A1 | 10/2009 | Cohen |
| 2010/0008031 A1 | 1/2010 | Reifman et al. |
| 2010/0313050 A1 | 12/2010 | Harrat et al. |
| 2011/0070864 A1* | 3/2011 | Karam ............... G06F 21/34 455/411 |
| 2011/0098087 A1 | 4/2011 | Tseng |
| 2011/0151934 A1 | 6/2011 | Geng |
| 2011/0161869 A1 | 6/2011 | Yoo |
| 2011/0212706 A1 | 9/2011 | Uusilehto |
| 2012/0009896 A1 | 1/2012 | Bandyopadhyay et al. |
| 2012/0032979 A1 | 2/2012 | Blow et al. |
| 2012/0081392 A1 | 4/2012 | Arthur |
| 2012/0159139 A1 | 6/2012 | Kim et al. |
| 2012/0162261 A1 | 6/2012 | Kim et al. |
| 2012/0174021 A1 | 7/2012 | Dharawat |
| 2012/0174237 A1 | 7/2012 | Krzyzanowsk |
| 2012/0179994 A1 | 7/2012 | Knowlton |
| 2012/0235790 A1 | 9/2012 | Zhao et al. |
| 2012/0251993 A1 | 10/2012 | Chidambaran |
| 2012/0297339 A1 | 11/2012 | Ito |
| 2013/0015946 A1 | 1/2013 | Lau et al. |
| 2013/0050120 A1 | 2/2013 | Takahashi et al. |
| 2013/0063611 A1 | 3/2013 | Papakipos et al. |
| 2013/0067566 A1 | 3/2013 | Oh |
| 2013/0076655 A1 | 3/2013 | Sipal et al. |
| 2013/0151963 A1 | 6/2013 | Costenaro et al. |
| 2013/0202161 A1 | 8/2013 | Shor et al. |
| 2013/0215060 A1 | 8/2013 | Nakamura et al. |
| 2013/0219345 A1 | 8/2013 | Saukko et al. |
| 2013/0219454 A1 | 8/2013 | Tewinson |
| 2013/0297675 A1 | 11/2013 | Li |
| 2013/0298024 A1 | 11/2013 | Rhee et al. |
| 2014/0022285 A1 | 1/2014 | Stovicek et al. |
| 2014/0028823 A1 | 1/2014 | Tahk et al. |
| 2014/0059365 A1 | 2/2014 | Heo et al. |
| 2014/0059673 A1 | 2/2014 | Azar et al. |
| 2014/0085460 A1 | 3/2014 | Park et al. |
| 2014/0118520 A1 | 5/2014 | Slaby et al. |
| 2014/0155031 A1 | 6/2014 | Lee et al. |
| 2014/0187200 A1 | 7/2014 | Reitter et al. |
| 2014/0203073 A1 | 7/2014 | Braun |
| 2014/0237378 A1 | 8/2014 | Gonen |
| 2014/0282877 A1 | 9/2014 | Mahaffey et al. |
| 2014/0283135 A1* | 9/2014 | Shepherd ............ G06F 3/04817 726/29 |
| 2014/0289843 A1* | 9/2014 | Chiang ............... G06F 3/04842 726/19 |
| 2014/0330569 A1 | 11/2014 | Kolavennu et al. |
| 2014/0364085 A1 | 12/2014 | Garcia |
| 2014/0366164 A1 | 12/2014 | Hoefgen et al. |
| 2015/0051913 A1 | 2/2015 | Choi |
| 2015/0147065 A1 | 5/2015 | Civelli et al. |
| 2015/0218872 A1 | 8/2015 | Breed |
| 2015/0223891 A1 | 8/2015 | Miller et al. |
| 2015/0358088 A1 | 12/2015 | Eim et al. |
| 2016/0109954 A1 | 4/2016 | Harris et al. |
| 2016/0142407 A1 | 5/2016 | Chun et al. |
| 2016/0155426 A1 | 6/2016 | Grunn et al. |
| 2017/0076077 A1* | 3/2017 | Zhao ................. G06K 9/00288 |
| 2019/0020801 A1 | 1/2019 | Shultz |
| 2019/0174419 A1* | 6/2019 | Schillings ............ G06N 3/084 |

FOREIGN PATENT DOCUMENTS

| | | |
|---|---|---|
| KR | 1020120038777 | 4/2012 |
| KR | 10-2061913 | 1/2020 |
| KR | 1020120038777 | 1/2020 |
| WO | 2004070591 A1 | 8/2004 |
| WO | 2006090899 A1 | 8/2006 |

(56) References Cited

FOREIGN PATENT DOCUMENTS

| WO | 2012049942 | 4/2012 |
|---|---|---|
| WO | 2012093784 A2 | 7/2012 |

OTHER PUBLICATIONS https://www.youtube.com/watch?v=VQKMoT-6XSg.
https://www.youtube.com/watch?v=yRvOlkSELNI&t=183s.
https://www.youtube.com/watch?v=xnLxKZK0fYU&t=707s.
https://www.youtube.com/watch?v=vOQXtR-mJKk&t=310s.
https://www.youtube.com/watch?v=nWdP0BJ8Wxg&t=13s.
https://web.archive.org/web/20140214075541/https://www.gsmarena.com/motorola_moto_x-5601.php.
https://www.gottabemobile.com/15-hidden-moto-x-features.
https://web.archive.org/web/20140210190047/http://www.talkandroid.com/reviews/phone/moto-xreview-finally-a-smartphone-with-features-that-matter/.
https://bgr.com/general/motorola-moto-x-review/.
https://www.middletownpress.com/news/article/Motorola-Moto-X-less-hello-Moto-more-hello-11784000.php.
https://web.archive.org/web/20140122063707/https://phandroid.com/2013/08/23/motorola-moto-xreview-video/.
https://www.cnet.com/tech/mobile/going-hands-free-with-the-moto-x-and-new-droidsmartphones.
https://www.pocket-lint.com/phones/news/motorola/123110-hands-on-motorola-skip-formoto-x-review/amp/.
https://www.talkandroid.com/guides/beginner/how-to-automatically-disable-androidssecurity-lock-screen-when-connected-to-your-home-wi-fi-bluetooth-device-or-by-location/; https://web.archive.org/web/20140201074414/https://www.gsmarena.com/samsung_i9295_galaxy_s4_active-5446.php.
https://www.youtube.com/watch?v=_FtNWYqI2WY.
https://web.archive.org/web/20140201074414/https://www.gsmarena.com/samsung_i9295_galaxy_s4_active-5446.php.
https://web.archive.org/web/20140323194552/http://www.techradar.com/reviews/phones/mobilephones/samsung-galaxy-s4-active-1160411/review/6#articleContent.
https://web.archive.org/web/20131223144050/https://play.google.com/store/apps/details?id=de.j4velin.delayedlock2&hl=en.
https://www.talkandroid.com/guides/beginner/how-to-automatically-disable-androids-security-lockscreen-when-connected-to-your-home-wi-fi-bluetooth-device or-by-location/.
https://web.archive.org/web/20131108183642/http://www.techradar.com/reviews/phones/mobilephones/samsung-galaxy-s4-active-1160411/review/2#articleContent.
https://web.archive.org/web/20131109210925/http://www.techradar.com/reviews/phones/mobilephones/samsung-galaxy-s4-active-1160411/review/9#articleContent.
https://web.archive.org/web/20131031235157/http://www.techradar.com/reviews/phones/mobilephones/samsung-galaxy-s4-active-1160411/review#articleContent.
https://www.youtube.com/watch?v=GWEyoS9JIXE.
https://www.youtube.com/watch?v=urA48TfGuKo.
https://www.youtube.com/watch?v=5j8aDmBvej8.
https://web.archive.org/web/20140201011449/https://www.gsmarena.com/samsung_galaxy_note_3-5665.php.
https://web.archive.org/web/20140221002031/http://www.anandtech.com/show/7376/samsunggalaxy-note-3-review/5.
https://www.youtube.com/watch?v=nI9n3xlEnJA.
https://web.archive.org/web/20140211200821/http://www.anandtech.com/show/7376/samsunggalaxy-note-3-review/7.
https://web.archive.org/web/20140110163135/https:/play.google.com/store/apps/details?id=com.benhirashima.skiplock.
https://web.archive.org/web/20140209033258/http://www.cultofandroid.com/49082/app-weekskiplock-app-installed-every-android-device-review/.
https://web.archive.org/web/20140101000954/http://benhirashima.com/posts/the-rebirth-of-unlockwith-wifi/.
https://web.archive.org/web/20140102024635/http://benhirashima.com/skiplock/faq.
Betiino, Nov. 1, 2011, Location-Based Access Control Systems for Mobile Users (4 pages).
Samsung Invalidity Contentions Exhibit '382-6 Zhao, Aug. 31, 2023.
Samsung Invalidity Contentions Exhibit '382-7 Na, Aug. 31, 2023.
Samsung Invalidity Contentions Exhibit '382-8 Hong, Aug. 31, 2023.
Samsung Invalidity Contentions Exhibit '382-9 Geng, Aug. 31, 2023.
Samsung Invalidity Contentions Exhibit '382-10 Ramaswamy, Aug. 31, 2023.
Samsung Invalidity Contentions Exhibit '382-11 Lee 434, Aug. 31, 2023.
Samsung Invalidity Contentions Exhibit '382-12 Kim, Aug. 31, 2023.
Samsung Invalidity Contentions Exhibit '382-13 Galaxy, Aug. 31, 2023.
Samsung Invalidity Contentions Exhibit '382-14 Android, Aug. 31, 2023.
Samsung Invalidity Contentions Exhibit '382-15 iPhone, Aug. 31, 2023.
Samsung Invalidity Contentions Exhibit '382-16 Surface Pro 4, Aug. 31, 2023.
Samsung Invalidity Contentions Exhibit '382-17 Park, Aug. 31, 2023.
Samsung Invalidity Contentions Exhibit '382-18 Oh, Aug. 31, 2023.
Samsung Invalidity Contentions Exhibit '382-19 Tahk, Aug. 31, 2023.
Samsung Invalidity Contentions Exhibit '473 (101), Aug. 31, 2023.
Samsung Invalidity Contentions Exhibit '473-1 Slaby, Aug. 31, 2023.
Samsung Invalidity Contentions Exhibit '473-2 Azar, Aug. 31, 2023.
Samsung Invalidity Contentions Exhibit '473-3 Lee, Aug. 31, 2023.
Samsung Invalidity Contentions Exhibit '473-4 Lau, Aug. 31, 2023.
Samsung Invalidity Contentions Exhibit '473-5 Papakipos, Aug. 31, 2023.
Samsung Invalidity Contentions Exhibit '473-6 Zhao, Aug. 31, 2023.
Samsung Invalidity Contentions Exhibit '473-7 Na, Aug. 31, 2023.
Samsung Invalidity Contentions Exhibit '473-8 Hong, Aug. 31, 2023.
Samsung Invalidity Contentions Exhibit '473-9 Geng, Aug. 31, 2023.
Samsung Invalidity Contentions Exhibit '473-10 Ramaswamy, Aug. 31, 2023.
Samsung Invalidity Contentions Exhibit '473-11 Lee 434, Aug. 31, 2023.
Samsung Invalidity Contentions Exhibit '473-12 Kim, Aug. 31, 2023.
Samsung Invalidity Contentions Exhibit '473-13 Galaxy, Aug. 31, 2023.
Samsung Invalidity Contentions Exhibit '473-14 Android, Aug. 31, 2023.
Samsung Invalidity Contentions Exhibit '473-15 iPhone, Aug. 31, 2023.
Samsung Invalidity Contentions Exhibit '473-16 Surface Pro 4, Aug. 31, 2023.
Samsung Invalidity Contentions Exhibit '473-17 Park, Aug. 31, 2023.
Samsung Invalidity Contentions Exhibit '473-18 Oh, Aug. 31, 2023.
Samsung Invalidity Contentions Exhibit '473-19 Tahk, Aug. 31, 2023.
Samsung Invalidity Contentions Exhibit '975 (101), Aug. 31, 2023.
Samsung Invalidity Contentions Exhibit '975-1 Slaby, Aug. 31, 2023.
Samsung Invalidity Contentions Exhibit '975-2 Azar, Aug. 31, 2023.
Samsung Invalidity Contentions Exhibit '975-3 Lee, Aug. 31, 2023.
Samsung Invalidity Contentions Exhibit '975-4 Lau, Aug. 31, 2023.

(56) References Cited

OTHER PUBLICATIONS

Samsung Invalidity Contentions Exhibit '975-5 Papakipos, Aug. 31, 2023.
Samsung Invalidity Contentions Exhibit '975-6 Zhao, Aug. 31, 2023.
Samsung Invalidity Contentions Exhibit '975-7 Na, Aug. 31, 2023.
Samsung Invalidity Contentions Exhibit '975-8 Hong, Aug. 31, 2023.
Samsung Invalidity Contentions Exhibit '975-9 Geng, Aug. 31, 2023.
Samsung Invalidity Contentions Exhibit '975-10 Ramaswamy, Aug. 31, 2023.
Samsung Invalidity Contentions Exhibit '975-11 Lee 434, Aug. 31, 2023.
Samsung Invalidity Contentions Exhibit '975-12 Kim, Aug. 31, 2023.
Samsung Invalidity Contentions Exhibit '975-13 Galaxy, Aug. 31, 2023.
Samsung Invalidity Contentions Exhibit '975-14 Android, Aug. 31, 2023.
Samsung Invalidity Contentions Exhibit '975-15 iPhone, Aug. 31, 2023.
Samsung Invalidity Contentions Exhibit '975-16 Surface Pro 4, Aug. 31, 2023.
Samsung Invalidity Contentions Exhibit '975-17 Park, Aug. 31, 2023.
Samsung Invalidity Contentions Exhibit '975-18 Oh, Aug. 31, 2023.
Samsung Invalidity Contentions Exhibit '975-19 Tahk, Aug. 31, 2023.
GT_I9300_UM_EU_Jellybean_Eng.
Android 4_0.
Phone7_iOS10.
Surface_pro_4_user_guide_EN.
Samsung Invalidity Contentions Exhibit '056 (101), Aug. 31, 2023.
Samsung Invalidity Contentions Exhibit '056-1 Slaby, Aug. 31, 2023.
Samsung Invalidity Contentions Exhibit '056-2 Azar, Aug. 31, 2023.
Samsung Invalidity Contentions Exhibit '056-3 Lee, Aug. 31, 2023.
Samsung Invalidity Contentions Exhibit '056-4 Lau, Aug. 31, 2023.
Samsung Invalidity Contentions Exhibit '056-5 Papakipos, Aug. 31, 2023.
Samsung Invalidity Contentions Exhibit '056-6 Zhao, Aug. 31, 2023.
Samsung Invalidity Contentions Exhibit '127-9 Geng, Aug. 31, 2023.
Samsung Invalidity Contentions Exhibit '127-10 Ramaswamy, Aug. 31, 2023.
Samsung Invalidity Contentions Exhibit '127-11 Lee 434, Aug. 31, 2023.
Bamsung Invalidity Contentions Exhibit '127-12 Kim, Aug. 31, 2023.
Samsung Invalidity Contentions Exhibit '127-13 Galaxy, Aug. 31, 2023.
Samsung Invalidity Contentions Exhibit '127-14 Android, Aug. 31, 2023.
Samsung Invalidity Contentions Exhibit '127-15 iPhone, Aug. 31, 2023.
Samsung Invalidity Contentions Exhibit '127-16 Surface Pro 4, Aug. 31, 2023.
Samsung Invalidity Contentions Exhibit '127-17 Park, Aug. 31, 2023.
Samsung Invalidity Contentions Exhibit '127-18 Oh, Aug. 31, 2023.
Samsung Invalidity Contentions Exhibit '127-19 Tahk, Aug. 31, 2023.
Samsung Invalidity Contentions Exhibit '382 (101), Aug. 31, 2023.
Samsung Invalidity Contentions Exhibit '382-1 Slaby, Aug. 31, 2023.
Samsung Invalidity Contentions Exhibit '382-2 Azar, Aug. 31, 2023.
Samsung Invalidity Contentions Exhibit '382-3 Lee, Aug. 31, 2023.
Samsung Invalidity Contentions Exhibit '382-4 Lau, Aug. 31, 2023.
Samsung Invalidity Contentions Exhibit '382-5 Papakipos, Aug. 31, 2023.
https://web.archive.org/web/20070116051415/https://www.gsmarena.com/apple_iphone-1827.php.
https://www.youtube.com/watch?v=r7fVWjgxRwk.
https://web.archive.org/web/20230111060843/https://www.gsmarena.com/apple_iphone_3g-2424.php.
https://manuals.info.apple.com/MANUALS/1000/MA1539/en_US/iPhone_iOS4_User_Guide.pdf.
https://manuals.info.apple.com/MANUALS/1000/MA1622/en_US/iphone_iOS5_user_guide.pdf.
https://www.techradar.com/reviews/phones/mobile-phones/google-nexus-one-665603/review.
https://www.gsmarena.com/htc_google_nexus_one-3069.php.
https://www.gsmarena.com/samsung_i7500_galaxy-2791.php.
https://web.archive.org/web/20110818134659/http://innovator.samsungmobile.com/bbs/tech/view.do?boardId=4&messageId=17461.
https://www.samsung.com/uk/mobile-phone-buying-guide/samsung-phone-ranges-explained/.
https://www.phonearena.com/news/Samsung-Galaxy-S-series-history-evolution_id78382.
https://images.samsung.com/is/content/samsung/assets/global/ir/docs/2013_business_quarter04.pdf.
https://web.archive.org/web/20130329203723/https://www.droid-life.com/2013/03/27/an-overview-of-android-lock-screen-security-options-beginners-guide/.
https://www.talkandroid.com/reviews/phone/moto-x-review-finally-a-smartphone-with-features-that-matter/.
https://www.gsmarena.com/motorola_moto_x-5601.php.
https://www.youtube.com/watch?v=yRvOlkSELNI.
https://www.anandtech.com/print/7235/moto-x-review.
https://web.archive.org/web/20120721171016/http://benhirashima.com/unlockwithwifi/.
https://web.archive.org/web/20110407065904/https://www.gsmarena.com/samsung_i897_captivate-3408.php.
https://web.archive.org/web/20111104215926/https://www.mobiletechreview.com/phones/Samsung-Captivate.htm.
https://web.archive.org/web/20130210092857/http://www.androidcentral.com/apps-week-eternity-warriors-2-chicken-bandit-espn-fantasy-football-and-more.
https://www.appbrain.com/app/unlock-with-wifi-trial/com.benhirashima.unlockwithwifitrial.
https://web.archive.org/web/20140205093444/http://benhirashima.com/posts/the-rebirth-of-unlock-with-wifi/.
https://www.youtube.com/watch?app=desktop&v=5j8aDmBvej8.
https://web.archive.org/web/20140131082015/http://www.anandtech.com/show/7376/samsung-galaxy-note-3-review.
https://www.appbrain.com/app/skiplock/com.benhirashima.skiplock.
https://web.archive.org/web/20111109101730/http://forum.xda-developers.com:80/showthread.php?t=955092.
https://web.archive.org/web/20140107211847/https://www.talkandroid.com/guides/beginner/how-to-automatically-disable-androids-security-lock-screen-when-connected-to-your-home-wi-fi-bluetooth-device-or-by-location/.
https://www.appbrain.com/app/delayed-lock/de.j4velin.delayedlock2.trial.
https://www.semanticscholar.org/paper/Location-Based-Authentication-and-Authorization-Zhang-Kondoro/b854f83ab609af8ac44c08e92a98a61fd84090ce; http://kth.diva-portal.org/smash/get/diva2:576463/FULLTEXT01.
Web: https://support.apple.com/en-us/HT204380, Apple, iOS7, Face Time, 7 pages.
Notification of transmittal of the international search report and the written opinion (12 pages) dated on 11, 2015.
Samsung Invalidity Contentions Exhibit '056-7 Na, Aug. 31, 2023.
Samsung Invalidity Contentions Exhibit '056-8 Hong, Aug. 31, 2023.
Samsung Invalidity Contentions Exhibit '056-9 Geng, Aug. 31, 2023.

(56) References Cited

OTHER PUBLICATIONS

Samsung Invalidity Contentions Exhibit '056-10 Ramaswamy, Aug. 31, 2023.
Samsung Invalidity Contentions Exhibit '056-11 Lee 434, Aug. 31, 2023.
Samsung Invalidity Contentions Exhibit '056-12 Kim, Aug. 31, 2023.
Samsung Invalidity Contentions Exhibit '056-13 Galaxy, Aug. 31, 2023.
Samsung Invalidity Contentions Exhibit '056-14 Android, Aug. 31, 2023.
Samsung Invalidity Contentions Exhibit '056-15 iPhone, Aug. 31, 2023.
Samsung Invalidity Contentions Exhibit '056-16 Surface Pro 4, Aug. 31, 2023.
Samsung Invalidity Contentions Exhibit '056-17 Park, Aug. 31, 2023.
Samsung Invalidity Contentions Exhibit '056-18 Oh, Aug. 31, 2023.
Samsung Invalidity Contentions Exhibit '056-19 Tahk, Aug. 31, 2023.
Samsung Invalidity Contentions Exhibit '127 (101), Aug. 31, 2023.
Samsung Invalidity Contentions Exhibit '127-1 Slaby, Aug. 31, 2023.
Samsung Invalidity Contentions Exhibit '127-2 Azar, Aug. 31, 2023.
Samsung Invalidity Contentions Exhibit '127-3 Lee, Aug. 31, 2023.
Samsung Invalidity Contentions Exhibit '127-4 Lau, Aug. 31, 2023.
Samsung Invalidity Contentions Exhibit '127-5 Papakipos, Aug. 31, 2023.
Samsung Invalidity Contentions Exhibit '127-6 Zhao, Aug. 31, 2023.
Samsung Invalidity Contentions Exhibit '127-7 Na, Aug. 31, 2023.
Samsung Invalidity Contentions Exhibit '127-8 Hong, Aug. 31, 2023.

\* cited by examiner

ELECTRONIC APPARATUS AND METHOD OF SELECTIVELY APPLYING SECURITY MODE IN MOBILE DEVICE

CROSS-REFERENCE TO RELATED APPLICATIONS

This U.S. non-provisional patent application is a divisional application under 35 U.S.C. § 120 of a U.S. non-provisional application Ser. No. 17/524,872 filed Nov. 12, 2021, now U.S. Pat. No. 11,595,507 which is a U.S. non-provisional application Ser. No. 16/581,558 filed Sep. 24, 2019, now U.S. Pat. No. 11,184,473, which is a divisional application of a U.S. non-provisional application Ser. No. 16/402,275 filed May 3, 2019, now U.S. Pat. No. 10,511,975, which is a divisional application of a U.S. non-provisional application Ser. No. 16/166,078 filed Oct. 20, 2018, now U.S. Pat. No. 10,299,133, which is a divisional application of a U.S. non-provisional application Ser. No. 16/127,286 filed on Sep. 11, 2018, now U.S. Pat. No. 10,149,164, which is a continuation application of a U.S. non-provisional application Ser. No. 15/984,375 filed on May 20, 2018, now U.S. Pat. No. 10,085,151 which is a continuation application of a U.S. non-provisional application Ser. No. 15/972,135 filed on May 5, 2018, now U.S. Pat. No. 10,111,098, which is a divisional application of a U.S. non-provision patent application Ser. No. 15/853,870 filed on Dec. 25, 2017, now U.S. Pat. No. 9,973,929, which is a continuation application of U.S. non-provisional application Ser. No. 15/297,069, filed on Oct. 18, 2016, now U.S. Pat No. 10,064,056, which is a continuation-in-part application of U.S. non-provisional patent application Ser. No. 14/181,728, filed on Feb. 17, 2014, now U.S. Pat. No. 9,509,822, in the U.S. Patent and Trademark Office, the entire contents of which are hereby incorporated by reference.

BACKGROUND OF THE INVENTIVE CONCEPT

1. Field of the Inventive Concept

The present inventive concept relates to an electronic apparatus and method of selectively applying a security mode in a mobile device.

2. Description of the Related Art

A conventional electronic mobile device, for example, a cellular phone, is set to a security mode or a non-security mode. When the set security mode is set, a user has to input a security code by enter a password, an image, or a geniture though a user interface unit. That is, a user has to input the security code every time to access the mobile device set with the security mode.

Even if a user is in a security safe zone, the user has to enter the security code previously set in the security mode. In order for the user to avoid inconvenience in the security safe zone, a user has to disable the security mode to avoid any inconvenience to enter the security code, and then later enable the security mode.

Moreover, since the mobile device is accessed only with the security code set in the security mode, no one is allowed to access the mobile device without the set security code. That is, a person having a high priority or authorization to access the mobile device cannot access the mobile device of a person having a lower priority or authorization.

SUMMARY OF THE INVENTIVE CONCEPT

The present inventive concept provides an electronic apparatus to selectively apply a security mode in a mobile device.

The present inventive concept provides a method of selectively applying a security mode in a mobile device.

The present inventive concept provides a computer readable medium to contain computer readable codes as a program to execute a method of selectively applying a security mode in a mobile device.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a mobile device, which includes a user interface including a display panel to display a menu image and a touch panel to receive a password, a network interface to detect an external device, a functional unit to sense a motion of the mobile device and to photograph a user, and a control unit to control the user interface, the network interface, the memory, and the functional unit, to unlock the mobile device according to a user identification process of identifying an authorized user, when the mobile device is in a time condition, in response to the sensed motion, and to unlock the mobile device according to the password when the mobile device is not in the time condition, in response to the sensed motion.

The user identification process may include photographing a user and determining whether the photographed user represents the authorized user, and the control unit may further include unlocking the mobile device according to the determination indicating that the photographed user represents the authorized user.

The user identification process may include photographing a user and determining whether the photographed user represents the authorized user, and the control unit may further include unlocking the mobile device according to the password when the photographed user does not represent the authorized user.

The user identification process may include detecting the external device and determining whether the detected external device represents the authorized user, and the control unit may further include unlocking the mobile device according to the determination indicating that the detected device user represents the authorized user.

The user identification process may include detecting the external device and determining whether the detected external device represents the authorized user, and the control unit may further include unlocking the mobile device according to the password when the determination indicates that the detected device user does not represent the authorized user.

The user identification process may include communicating with the detected external device and determining whether the communication represents the authorized user, and the control unit may further include unlocking the mobile device according to the determination indicating that the communication represents the authorized user.

The user identification process comprises communicating with the detected external device through a network and determining whether the communication represents the authorized user, and the control unit may further include unlocking the mobile device according to the password when the determination indicates that the communication does not represent the authorized user.

The user identification process may include recognizing a location of the mobile device and determining whether the location of the mobile device represents the authorized user, and the control unit may further include unlocking the mobile device according to the determination indicating that the location of the mobile device represents the authorized user.

The user identification process may include recognizing a location of the mobile device through the communication with the detected external device though a network, and determining whether the location of the mobile device represents the authorized user, and the control unit may further include unlocking the mobile device according to the password when the determination indicates that the detected device does not represent the authorized user.

The user identification process may include communicating with the detected external device through a network, recognizing a location of the mobile device through the communication, and determining whether the location of the mobile device represents the authorized user, and the control unit may further include unlocking the mobile device according to the determination indicating that the location of the mobile device represents the authorized user.

The user identification process may include communicating with the detected external device through a network, recognizing a location of the mobile device through the communication, and determining whether the location of the mobile device represents the authorized user, and the control unit may further include unlocking the mobile device according to the determination indicating that the location of the mobile device does not represent the authorized user.

The time condition may include a period of time.

The user identification process may include photographing a user and determining whether the photographed user represents the authorized user, the control unit may further include performing a second user identification process when a first determination indicates that the photographed user does not represents the authorized user, the second user identification process may include detecting the external device and determining whether the detected external device represents the authorized user, and the control unit may further include unlocking the mobile device according to a second determination indicating that the detected external device represents the authorized user.

The user identification process may include photographing a user and determining whether the photographed user represents the authorized user, the control unit may further include performing a second user identification process when a first determination indicates that the photographed user does not represents the authorized user, the second user identification process may include detecting the external device and determining whether the detected external device represents the authorized user, and the control unit may further include unlocking the mobile device according to the password when a second determination indicates that the detected external device does not represent the authorized user.

The user identification process may include detecting the external device and determining whether the detected external device represents the authorized user, the control unit may further include performing a second user identification process when a first determination indicates that the detected external device does not represent the authorized user, the second user identification process may include photographing a user and determining whether the photographed user represents the authorized user; and the control unit may further include unlocking the mobile device according to a second determination indicating that the photographed user represents the authorized user.

The user identification process may include detecting the external device and determining whether the detected external device represents the authorized user, the control unit may further include performing a second user identification process when a first determination indicates that the detected external device does not represent the authorized user, the second user identification process may include photographing a user and determining whether the photographed user represents the authorized user, and the control unit may further include unlocking the mobile device according to the password when a second determination indicates that the photographed user does not represent the authorized user.

The motion may include a moving state and a stationary state indicating that a user is in front of the display panel for a period of time at an end of the moving state, and the functional unit may sense the stationary state for the period of time as the sensed motion.

The display panel may display a user menu for the user identification process at a user finger unreachable area, and the control unit may control the display panel to display the user menu at a user finger reachable area such that a finger of a hand holding the mobile device can reach the user menu.

The display panel may include a user finger unreachable area and a user finger reachable area defined by a line, and the control unit may control the display panel to display a user menu at the user finger reachable area defined by the line.

The control unit may control the display panel to display a symbol representing he user identification process.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
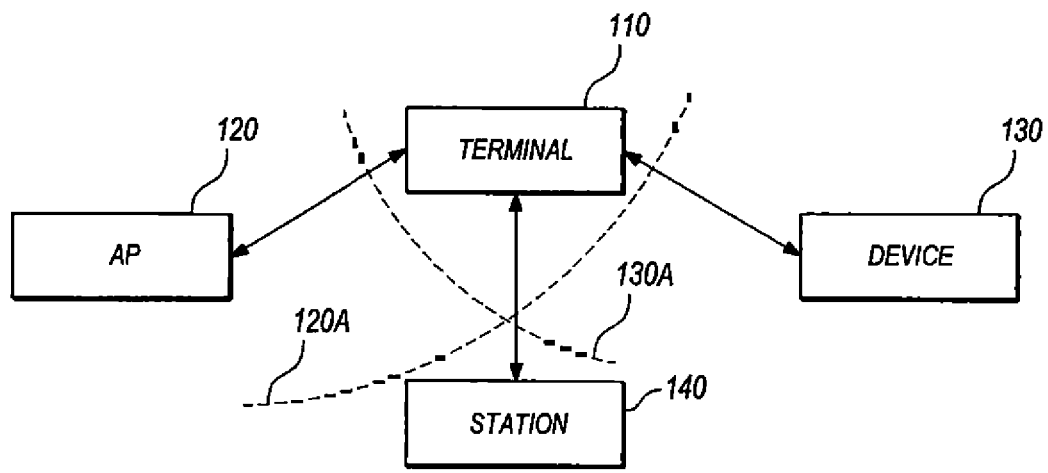
FIG. 1 is a block diagram illustrating an electronic terminal to communicate with external devices according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 illustrates an electronic terminal apparatus 110 to communicate with one or more external apparatuses according to an embodiment of the present inventive concept. The electronic terminal apparatus 110 may be a computer apparatus, a portable personal computer, a mobile electronic device, a mobile phone, a mobile tablet apparatus, a mobile tablet computing apparatus, an audio or video recording and/or reproducing apparatus, a photographing apparatus, a communication device, etc.

The external apparatus may be an access point (AP) 120 such as a wireless access point device to connect to a wired network using WiFi, WiFi direct, or related standards, a device 130 such as a Bluetooth device or radio frequency identification (RFID) device, etc, and a station 140 for wireless communication such as a carrier service station for 4G, LTE, etc. However, the present general inventive concept is not limited thereto. It is possible that the external apparatus may be another electronic apparatus. It is also possible that the external apparatus may be an apparatus to communicate with the terminal 110 to transmit and receive data therebetween, and such an apparatus may be a home appliance, such as a refrigerator or air conditioner.

The terminal 110 may be disposed within an area defined by a line 120A distanced from the AP 120 or an area defined by a line 130A distanced from the device 130. The terminal 110 may communicate with the AP 120 using the AP-related technology when being disposed within the area defined by the line 120A, and may also communicate with the device 130 using the device-related technology when being disposed within the area defined by the line 130A.

The terminal 110 may have menus and/or functions to correspond to data (signal) of the AP 120, the device 130, and the station 140. The terminal 110 may have menus and functions to correspond to data (signal) stored in a storage unit of the terminal 110.

Figure 2:
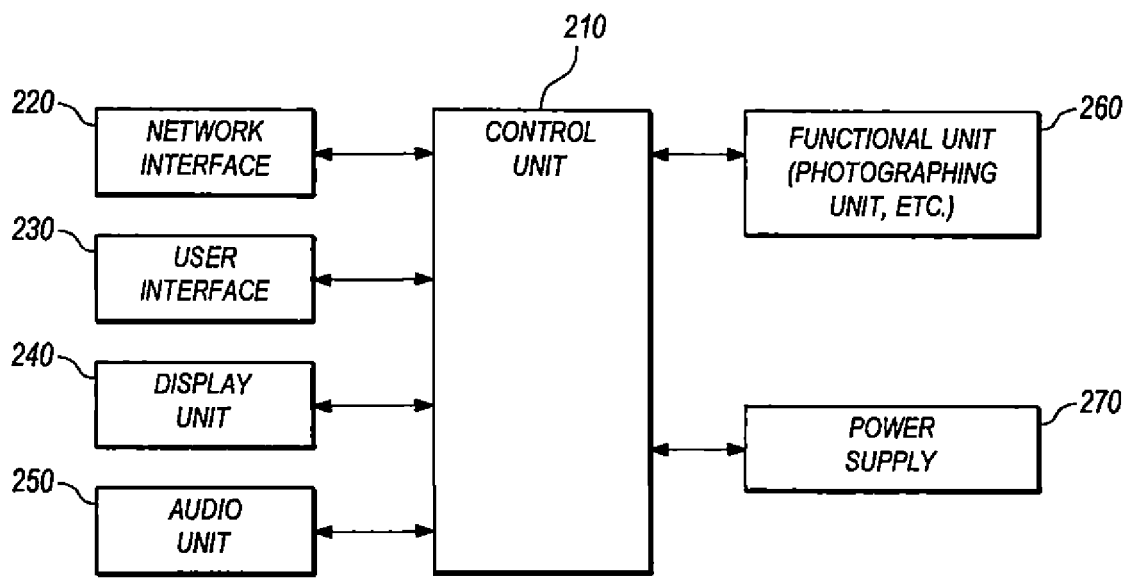
FIG. 2 is a diagram illustrating an electronic terminal according to an embodiment of the present inventive concept.

FIG. 2 illustrates a block diagram of an electronic terminal according to an embodiment of the present inventive concept. The terminal may include a control unit 210, a network interface 220, a user interface 230, a display unit 240, an audio unit 250, one or more functional unit 260, a power supply unit 270 including a battery and a battery charging unit. The above components may be disposed in or on a housing of the terminal.

The control unit 210 may control operations of the terminal and may include a data storage unit, for example, a semiconductor memory unit. The control unit 210 may be connected to an external data storage unit disposed in the housing. The housing of the terminal may include a port such that another external data storage can be detachably attached to the port of the housing, and the port may be connected to the control unit 110 to transmit and receive data.

The network interface unit 220 may communicate with an external network apparatus, for example, the AP 120, the device 130, and the station 140 which are illustrated in FIG. 1.

The user interface unit 230 may receive a user input to control operations of the terminal. The user interface unit 230 may include a physical button or key board such as QWERTY keyboard. The user interface unit 230 may have a sensor to detect a user gesture as a user input. The user interface unit 230 may include a microphone to detect a user voice as a user input. The user interface unit 230 may be a sensor to detect an image as a user input. The display unit 240 may include a screen to display an image corresponding to operations of the terminal. The display unit 240 may include a panel or a touch screen to perform a function to display an image and also a function to receive a user input. The user interface unit 230 and the display unit 240 may be formed as a single integrated body. The audio unit 250 may be a speaker and/or a microphone.

The functional unit 260 may be a photographing unit to photograph an object and to generate a signal corresponding to the photographing object. The signal may be processed in the control unit 210, displayed in the display unit 240, and/or transmitted to the external apparatus through the network interface unit 220.

The power supply unit 270 may be connectable to an external power source using a wired and/or wireless method.

The control unit 210 is configured to selectively perform a security mode according to a condition set by a user when the terminal receives a user input corresponding to a power-on, an activation mode in response to a deactivation mode, a wake-up mode in response to a sleep mode, and/or a normal mode in response to a power-saving mode. The activation, wake-up, and normal mode may be usable as a common function of the terminal or may be usable differently, according to a design or user preference. The condition may be a safe zone condition in a security mode or may be a non-safe zone in a non-security mode, for example. After the condition is set in a normal mode of the terminal, the terminal is changed to the deactivation mode (the sleep mode or the power-saving mode) a predetermined time after the normal mode or a predetermined time after no user input. And then the terminal provides a process for the security mode or does not provide the process for the security mode according to the condition when being changed to the activation mode (wake-up mode or the normal mode) according to the user input.

FIGS. 3A-3D illustrating an electronic terminal 300 formed with a display unit and a user interface unit to display screens 300A-300D corresponding to operations of the electronic terminal 300 according to an embodiment of the present inventive concept.

Figure 3A:
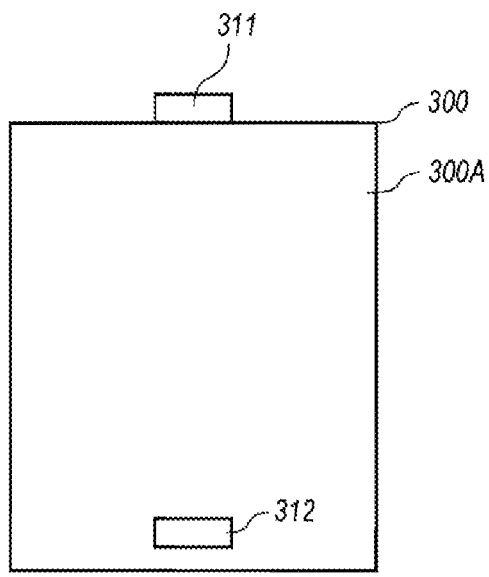
FIGS. 3A-3D are views illustrating an electronic terminal with a display unit and a user interface unit according to an embodiment of the present inventive concept.

As illustrated in FIG. 3A, the screen 300A of the terminal 300 A does not show an image according to a deactivation mode, a sleep mode, or a power saving mode. The terminal 300 may have a power switch 311 and a switch 312 as a user input. The power switch 311 may be usable to turn on and off the terminal, and the switch 312 may be usable to change a mode of the terminal 300, that is, to change from the deactivation mode, the sleep mode, or the power saving mode to an activation mode, a wake-up mode, or a normal mode. The switch 312 may be a sensor to detect a motion of the terminal 300 or to detect a motion (image) of a user as a user input.

Figure 3B:
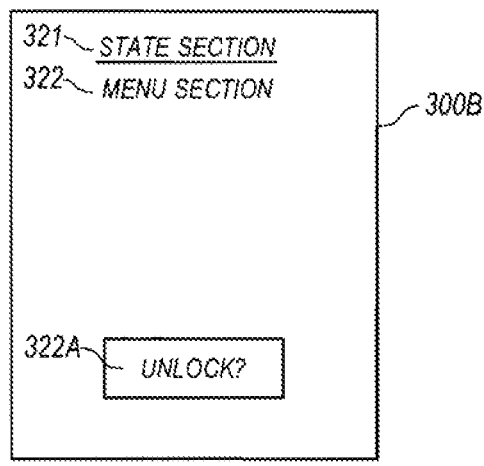

When the switch 312 of FIG. 3A is selected, the screen 300B of FIG. 3B may be displayed on a display unit to unlock or select a security process to access the terminal 300 in a security mode. The screen 300B may include a state section 321 and a menu section 322. The state section 321 may include a communication state with the AP 120, the device 130, and/or the station 321 of FIG. 1, and may also include other states corresponding to operations or functions set in the terminal 300 or environment around the terminal 300. The other states may include a time display or a battery state display, a temperature state display, a weather state display, etc. When the terminal 300 is in a power-on state, the terminal monitors, detects, determines, and/or performs communications with external devices to correspond to the above-described states of the state section 321.

Figure 3C:
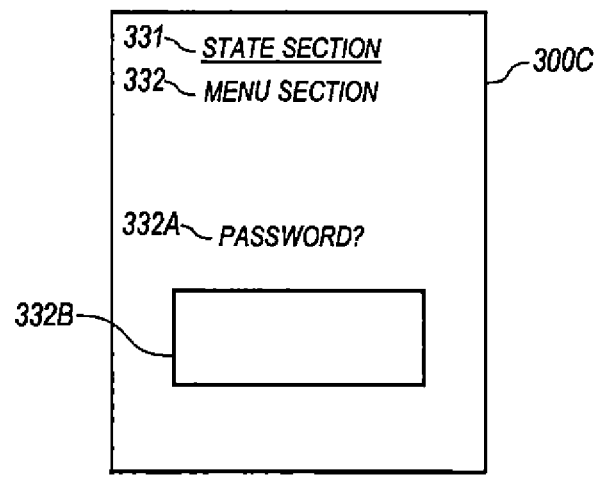
Figure 3D:
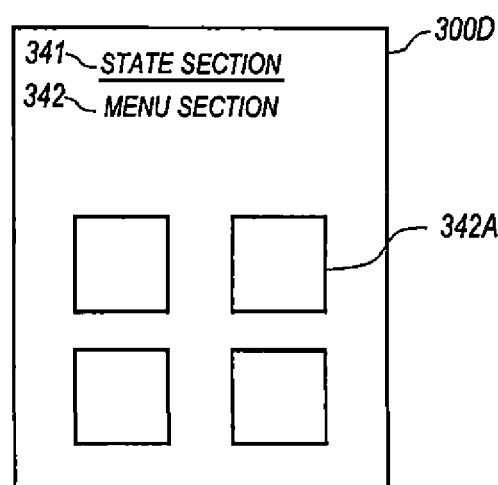

When a menu 322A to unlock the terminal 300 is selected from the screen 300B, the screen 300C is displayed to show a security check process, for example, a password input process, as illustrated in FIG. 3C. The screen 300C may include a state section 331 and a menu section 332 having a password indication section 332A and a password input section 332B. When a password input by the user through the password input section 332B is identical to a password previously stored therein, the terminal 300 displays the screen 300D to show a state section 341 and a menu section 342 with menus (or icons) 342A.

When a first predetermined condition is set in the terminal 300 as a safe zone in a security mode (password setting mode), the screen 300A is changed to the screen 300D without displaying the screens 300B and 300C when the first predetermined condition is met. When the first predetermined condition is not met, the terminal displays the screens 300B and 300C to require a security process to enter a password. When a second predetermined condition is set in the terminal 300 as a non-safe zone in a non-security mode (no password setting), the terminal displays the screens 300A, 300B, 300C, and 300D to normally access the terminal when the second predetermined condition is met. When the second predetermined condition is not met, the terminal 300 may not display the screens 300B and 300C.

The state section 341 of the screen 300D may include an image corresponding to the safe zone and/or the non-safe zone according to the security mode and/or non-security mode, respectively. The state section 341 may not be selectable by a user as a user input. The menu section 342 of the screen 300D may include one or more menus 342A selectable by a user as a user input to perform a function or operation of the terminal 300. The menu section 342 of the screen 300D may include a settings menu (icon) to set the security mode, the non-security mode, the safe zone, and/or the non-safe zone, etc.

Figure 4:
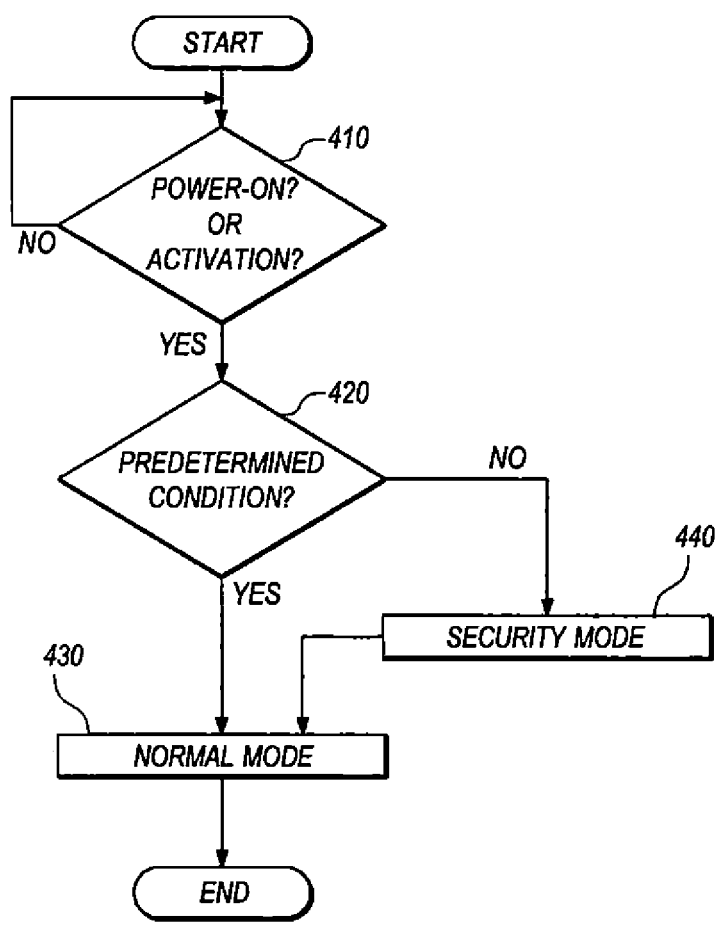
FIG. 4 is a flowchart illustrating a method of selectively applying a security process in a mobile device according to an embodiment of the present inventive concept.

FIG. 4 illustrates a method of selectively applying a security mode in a mobile device according to an embodiment of the present inventive concept.

A power-on or activation switch is on in operation 410, a control unit of the mobile device determines whether a predetermined condition is met in operation 420. When the predetermined condition is met, that is, the mobile device is in a safe zone, the mobile device operates a normal mode in operation 430 such that a user can access the mobile device. When the predetermined condition is not met in operation 420, that is, the mobile device is not in the safe zone, the mobile device requires a user to enter a password in operation 440 to authorize the user to access of the mobile device.

Figure 5:
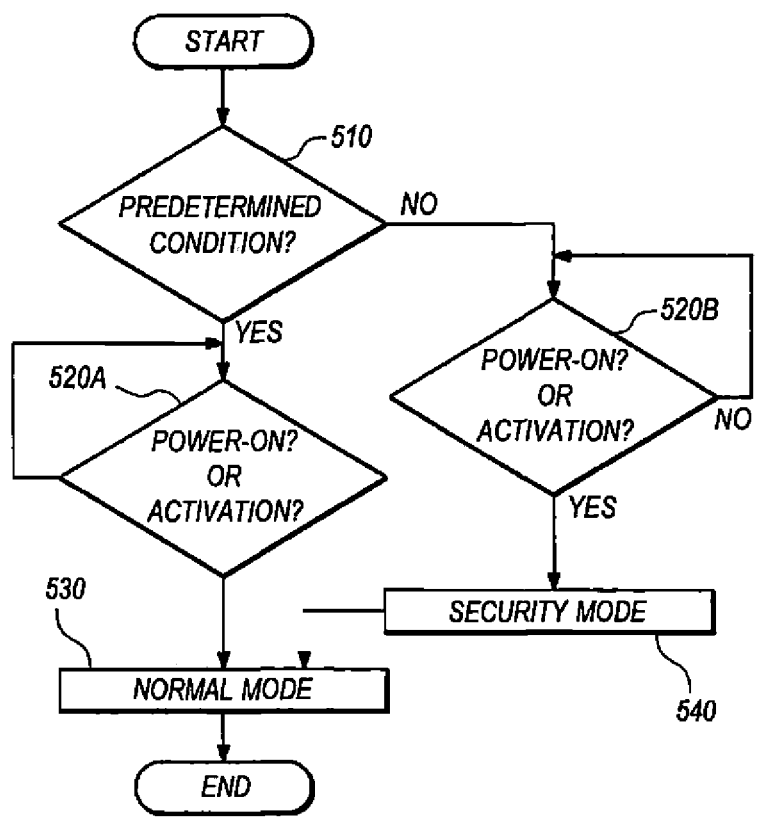
FIG. 5 is a flowchart illustrating a method of selectively applying a security process in a mobile device according to an embodiment of the present inventive concept.

FIG. 5 illustrates a method of selectively applying a security mode in a mobile device according to an embodiment of the present inventive concept A predetermined condition is set in the mobile device in operation 510. When an activation switch is selected in operations 520A or 520B, a security mode is not performed to enter a normal mode in operation 530 or the security mode is performed in operation 540 when the predetermined condition is not met in operation 510. That is, the mobile device selectively performs the security mode according to selection of an activation switch as a user input. The mobile device selectively requires a user to perform the security mode. For example, when the mobile device is in a safe zone according to the predetermined condition, the user is not required to process the security mode to enter a password. However, the mobile device is not in the safe zone according to the predetermined condition, the user is still required to process the security mode to enter a password. Here, the password may be a character, number, motion, audio, and/or image.

Figure 6A:
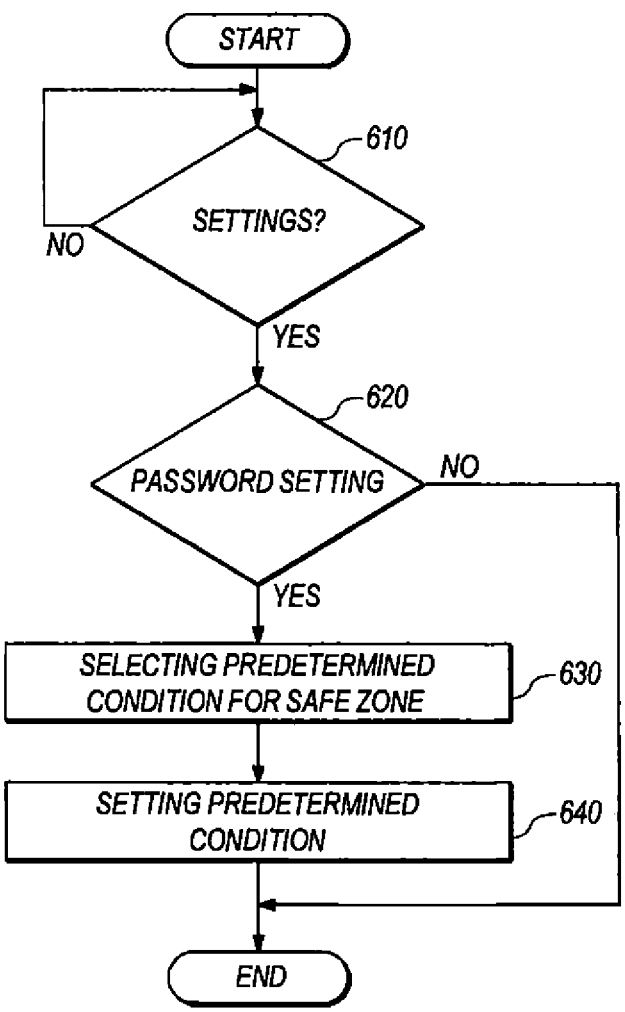
FIG. 6A is a flowchart illustrating a method of setting a condition for a safe zone in a password setting mode of a mobile device according to an embodiment of the present inventive concept.

FIG. 6A illustrates a method of setting a condition for a safe zone in a password setting mode of a mobile device according to an embodiment of the present inventive concept A user selects a settings menu in operation 610, and then selects a password setting menu in operation 620 to set the mobile device as a security (password setting) mode or a non-security (no-password setting) mode.

A predetermined condition for a safe zone is selected in operation 630, and then is set in operation 640.

Figure 6B:
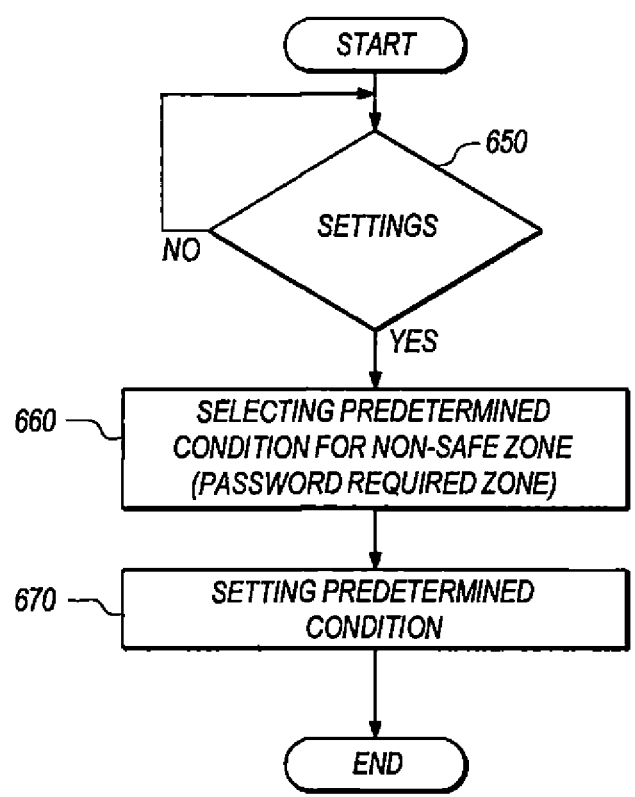
FIG. 6B is a flowchart illustrating a method of setting a condition for a non-safe zone in a non-password mode of a mobile device according to an embodiment of the present inventive concept.

FIG. 6B illustrates a method of setting a condition for a non-safe zone in a non-password mode of a mobile device according to an embodiment of the present inventive concept.

When a user selects a non-security (no-password setting) mode or does not set a security mode in the settings menu in operation 650, the settings menu may further include a menu to select a non-safe zone (or password-required zone) in operation 660. The predetermined condition can be set in operation 670 such that the mobile device monitors a current condition thereof to determine whether the current condition meets the predetermined condition. When the predetermined condition is met, the mobile device requires the user to enter a password to access the mobile device in the non-security mode of the mobile device. When the predetermined condition is not met, the mobile device does not require the user to enter the password in a similar manner to the non-security mode.

FIGS. 7A through 7I illustrate screens 700A through 700I of a mobile device to set a condition for a safe zone of a security mode or a non-safe zone of a non-security mode according to an embodiment of the present inventive concept.

Figure 7A:
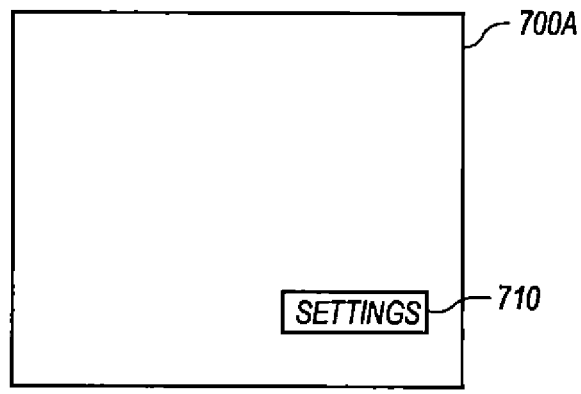
FIGS. 7A through 7I are views illustrating screens of a mobile device to set a condition in a mobile device according to an embodiment of the present inventive concept.
Figure 7B:
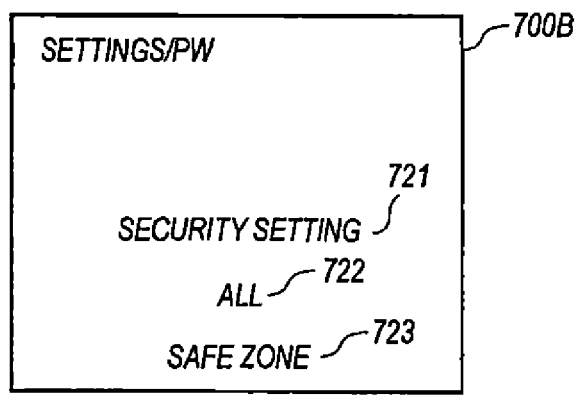
Figure 7C:
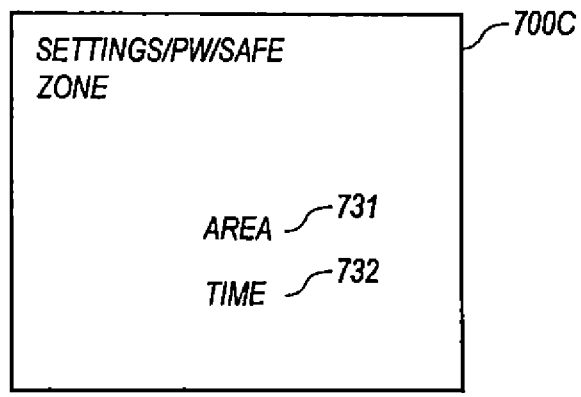

When a settings menu (button or icon) 710 is selected in the screen 700A of the mobile device as a user input in FIG. 7A, the screen 700B of FIG. 7B is displayed on a display unit and/or user input unit of the mobile device to show a selection of "security setting" 721 to set a security (password) as a security mode, a selection of "all" 722 to apply the security mode to all functions or operations of the mobile device, and a selection of a "safe zone" 723 to prevent the security mode in a predetermined condition. It is possible that the selection of "all" 722 and selection of "safe zone" 723 may be displayed in a separate screen from a screen of the security setting 721, that is, the selection of "all" 722 and selection of "safe zone" 723 may be displayed, performed, or selected independently after the security setting 721 is performed to set the security mode.

When a menu of the safe zone 723 is selected, the screen 700C is displayed to show an area menu 731 and/or a time menu 732 as the predetermined condition. It is possible that both the area menu 731 and the time menu 732 can be selected and set as the predetermined condition. It is also possible that only one of the area menu 731 and the time menu 732 can be selected and set as the predetermined condition.

When the time menu 732 is selected, a specific time or a time period is set as the safe zone, using a new screen. Setting a specific time or a time period is well known, detail descriptions thereof will be omitted. When the time menu is performed to set the predetermined condition of the safe zone, the mobile device releases the security mode at the specific time or during the time period such that the user can access the mobile device without the security process according to the set time menu.

Figure 7D:
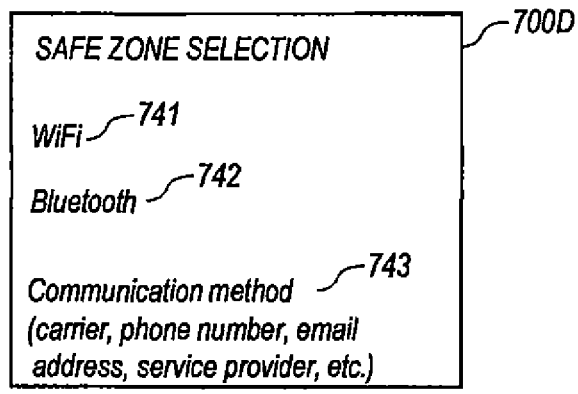

When the area menu 731 is selected, one or more area settings are displayed on the screen 700D of FIG. 7D. The one or more area settings may include a WiFi selection menu 741, a Bluetooth selection menu 742, and a communication method selection menu 743.

Figure 7E:
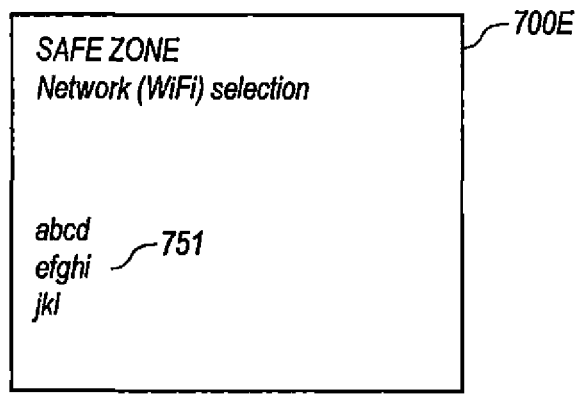

When the WiFi menu 741 is selected, at least one WiFi network 751 can be input, detected and then displayed, or selected as a safe zone in the screen 700E of FIG. 7E. When a user with a mobile device stays in a house of the user, for example, and an AP is located as a home use inside the house of the user, the AP as a home use may be reliable network and environment to the user and thus the home AP can be set as a safe zone. In this case, the user does not have to enter a password every time to activate or access the mobile device within an accessible area of the AP and/or inside the house. However, when a user with a mobile device stays away from the AP, the mobile device requires the user to enter the password since the predetermined condition is not met or the mobile device cannot communicate with the AP or lost a signal from the AP.

Figure 7F:
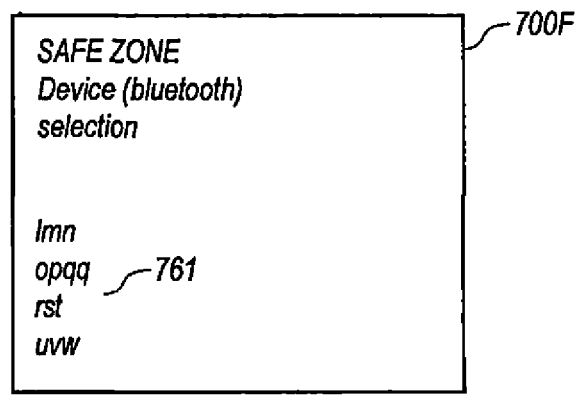

When the Bluetooth (device) is selected, at least one device 761 can be input, detected and then displayed, or selected as a safe zone in the screen 700F of FIG. 7F. When a user with a mobile device is in a vehicle owned by the user, for example, the Bluetooth and/or the vehicle may be reliable network and environment to the user and thus the device can be set as a safe zone. In this case, the user does not have to enter a password every time to activate or access the mobile device within an access area of the device, that is, within an inside of the vehicle.

It is possible that when a user vehicle is set as the device or the AP for the safe zone and when a signal indicating an emergence, for example, traffic collision or accident to the vehicle, is generated from the vehicle and then transmitted to the mobile device through the Bluetooth or WiFi, the mobile device can recognize the received signal as a predetermined condition of a safe zone so that the user can access and/or use the mobile device without entering a password in the security mode of the mobile device. Here, the vehicle and the mobile device are configured to recognize the signal as a portion of the predetermined condition of a safe zone. In this case, a combination of the selected device and a specific or predetermined signal from the selected device can be set as the safe zone of the mobile device, and when the mobile device receives the signal from the device, so that the user can access or use the mobile device without performing a security check process in a security mode of the mobile device.

It is also possible that when a user medical device is set as the device or the AP for the safe zone and when a signal indicating an emergence for example, a life threatening situation or accident to the user, is generated from the medical device and then transmitted to the mobile device through the Bluetooth or WIFi, the mobile device can recognize the received signal as a predetermined condition of a safe zone so that the user can access and/or use the mobile device without entering a password in the security mode of the mobile device. Here, the medical device and the mobile device are configured to recognize the signal as a portion of the predetermined condition of safe zone. In this case, a combination of the selected device and a specific or predetermined signal from the selected device can be set as a predetermined condition of the safe zone of the mobile device, and when the mobile device receives the signal from the device, so that the user can access or use the mobile device without performing a security check process in a security mode of the mobile device.

Figure 7G:
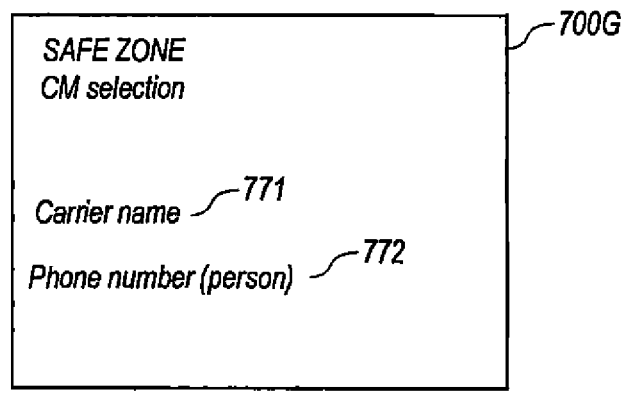

When the communication method 743 is selected, one or more communication methods (CMs) 771 and 772 can be selected and set as a safe zone on the screen 700G of FIG. 7G. In this case, a carrier name 771 and/or telephone number 772 can be reliable to the user. That is, when the user communicates with the person of the telephone number 772 and the carrier name 771, the user does not have to enter a password to use the mobile device.

Figure 7H:
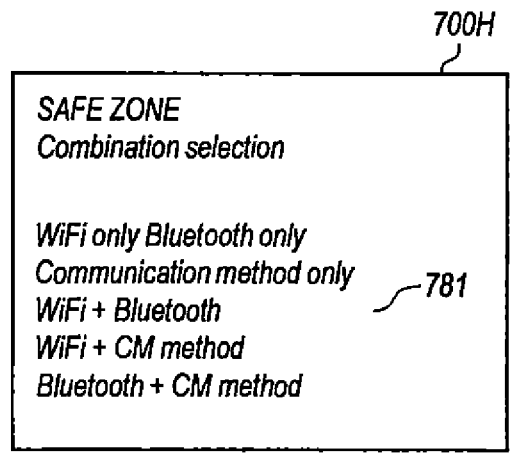
Figure 7I:
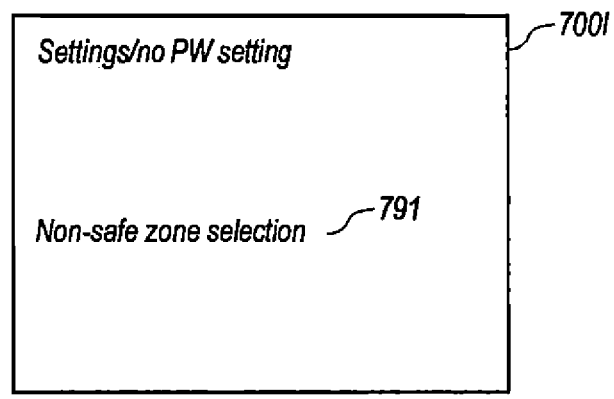

In the screen 700H of FIG. 7H, at least one or a combination of the Wifi, Bluetooth, and communication method can be selected and/or set in a menu 781 as safe zone.

When the security mode is not selected or set in the settings menu 710 of the screen 700A, a menu 791 of non-safe zone can be selected and set such that the mobile device is set to perform a security mode in a non-security mode of the mobile device. For example, an AP, a device, or a communication method is set as the non-safe zone using one or more non-safe zone selection processes similar to the safe zone selection processes of FIGS. 7D through 7H.

Figure 8A:
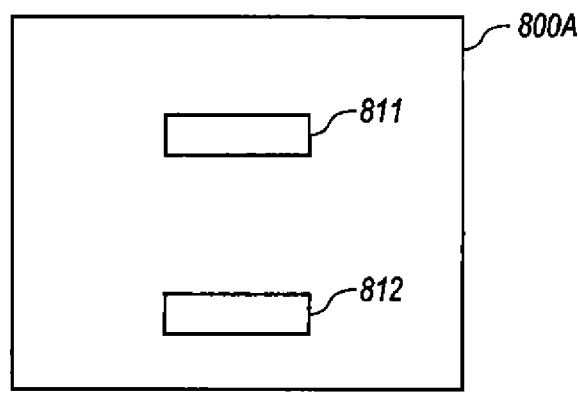
FIGS. 8A through 8F are views illustrating screens of a mobile device to perform operations in a safe zone and in a non-safe zone according to an embodiment of the present inventive concept.
Figure 8B:
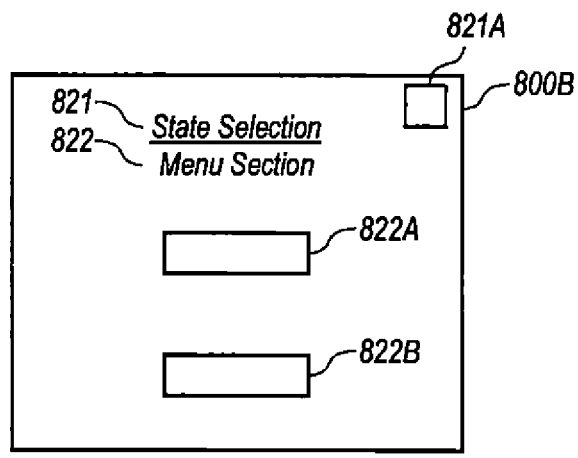
Figure 8C:
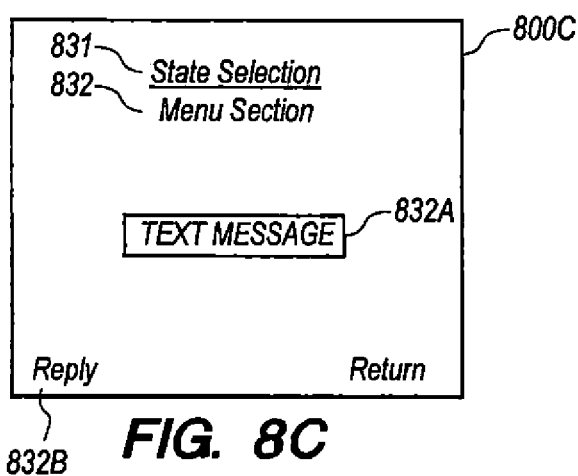
Figure 8D:
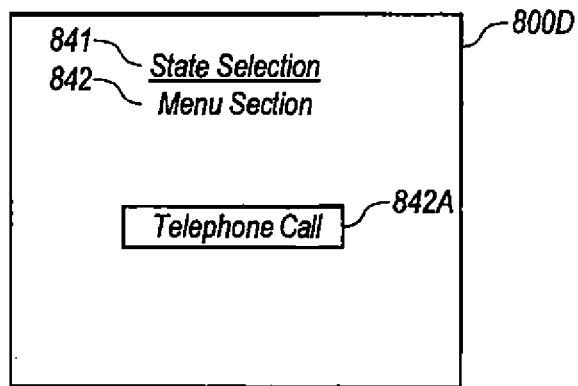

FIGS. 8A through 8F illustrate screens 800A through 800F of a mobile device to perform operations in a safe zone and in a non-safe zone according to an embodiment of the present inventive concept FIG. 8A illustrates the screen 800A, a power on/off switch 811, and an activation switch 812. FIG. 8B illustrates the screen 800B including a state section 821 and a menu section 822. The state section 821 may be similar to the state section 321, 331, and 341 of FIGS. 3B, 3C and 3D. The state section 821 may include a state indicator 821A to indicate a predetermined state and/or a safe zone in a security mode. The states displayed on the state section 821 may not be selectable by a user as a user input. The menu section 822 may include one or more menus 822A and 822B which are displayable on a display unit and/or selectable by a user as a user input.

When a current condition matches the predetermined condition as the safe zone, the mobile device displays the screen 800B by skipping a security mode process. It is possible that the mobile device can display on the screen 800C with a state section 831 and a menu section 832 including a text message 832A and selection menus 832B relating to the displayed text 832A when the mobile device receives the test message 832A. It is also possible that the mobile device can display on the screen 800D with a state section 841 and a menu section 842 including a telephone call message 842A including selection menus relating to the telephone call message 842A when the mobile device receives the telephone call such that the user can access and use the mobile device.

Figure 8E:
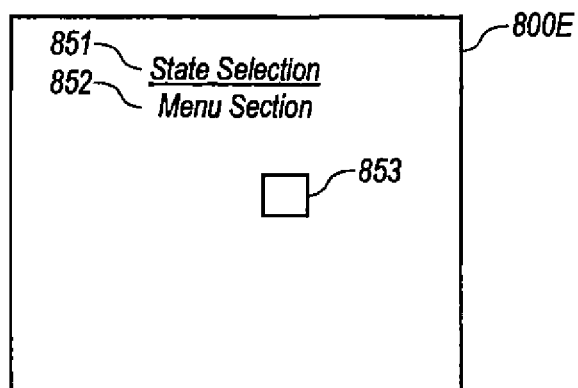
Figure 8F:
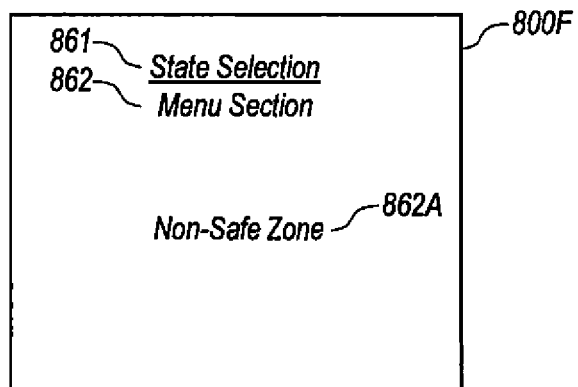

The screen 800E of FIG. 8E illustrates a state section 851 and a menu section 852 including at least one menu 853. The screen 800E may be displayed when a password is entered in a security (password-setting) mode, when a predetermined condition of a safe zone is met in the security mode, or when a password is entered in a non-security mode and in a non-safe zone. The menu 853 may be a settings menu to select, change, or modify settings of the mobile device. In this case, it is possible that the mobile device may require the user to enter a password to select, change, or modify settings when the screen 800E is displayed when a predetermined condition of a safe zone is met in the security mode and accordingly a security mode is not preformed.

Figure 9:
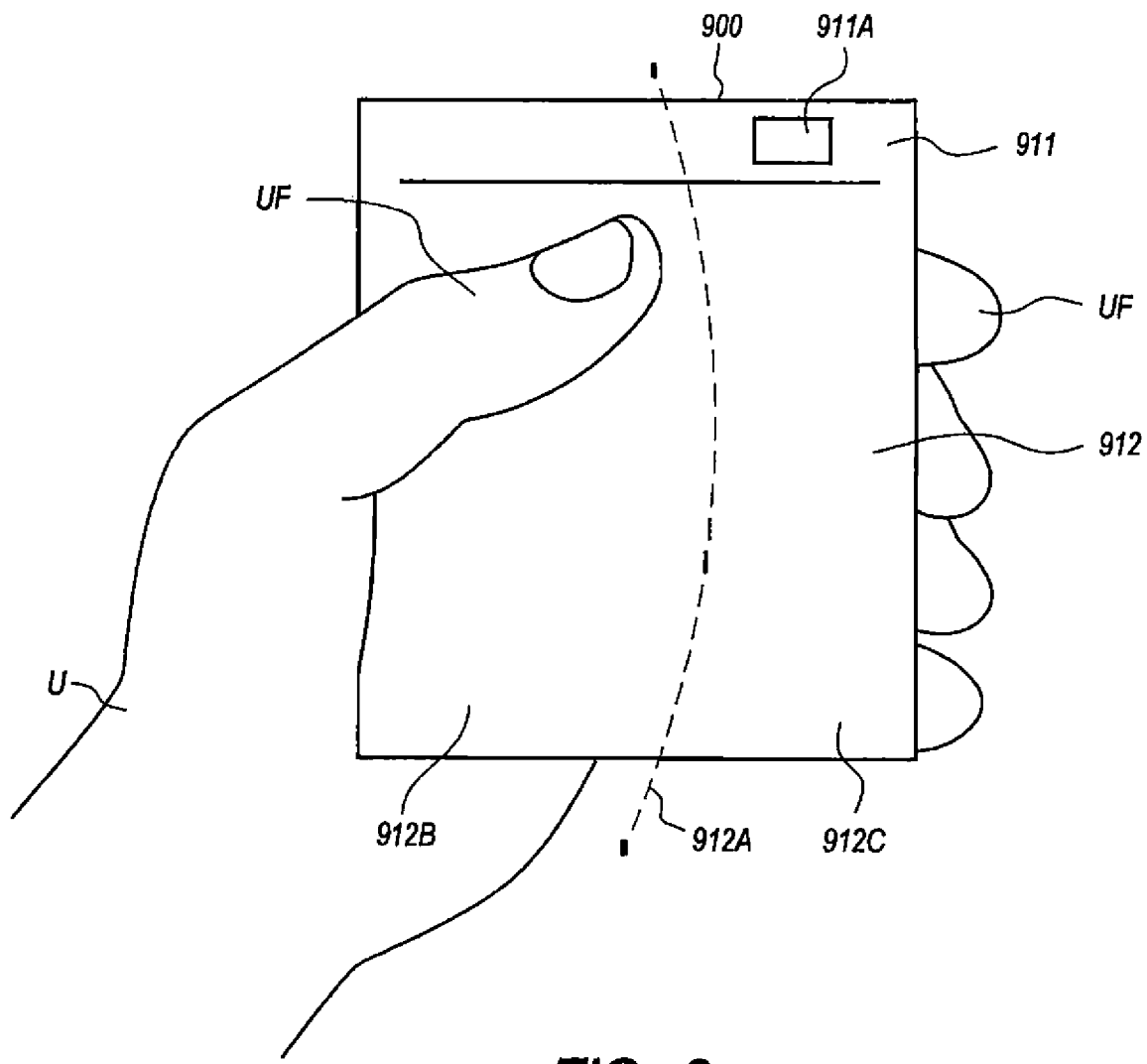
FIG. 9 is a view illustrating a mobile device to display a user input menu within a user finger-reaching area according to an embodiment of the present inventive concept.

FIG. 9 illustrates a mobile device 900 to display a state section 911 and a user menu section 912 according to an embodiment of the present general inventive concept. A user U holds the mobile device 900 using one hand. At least one of user fingers UF of the user one hand can be usable to select a menu to input a user input. The user menu section 912 may include a user menu area 912B and a non-user menu area 912C which are defined by a line 912A to be a user-finger reachable area and a user-finger unreachable area, respectively. One or more menus or images displayed within the user menu area can be selectable by a user using a finger without assistance of the other hand finger, and one or more menus or images displayed within the non-user menu area 912C may not be reachable selectable by the user using the same finger. It is possible that the non-user menu area 912C may not include a menu to be selectable by a user as a user input. Accordingly, a user can control the mobile device with one hand.

Figure 10A:
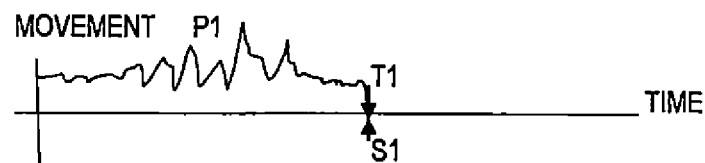
FIGS. 10A, 10B, 10C, and 10D are graphs each schematically illustrating movement patterns of a mobile device according to an embodiment of the present inventive concept.

FIGS. 10A, 10B, 10C, and 10D are graphs schematically illustrating a motion of a mobile device according to an embodiment of the present inventive concept. The graph of FIG. 10A illustrates the motion of the mobile device. The motion of the mobile device may be represented by a pattern (or movement pattern) P1 with amplitudes with respect to a movement axis. The amplitudes may be represented with respect to a time axis. The mobile device may be movable and/or rotatable in up and down directions, back and forth directions, side directions, different directions, etc. The amplitudes may be exaggerated by eliminating crossing portions in which the mobile device changes the directions thereof and/or by eliminating relatively small portions of the amplitudes before or after the direction changes. Values of the amplitudes may be an absolute value.

The mobile device may be same as the mobile device illustrated in FIG. 2. The functional unit 260 of the mobile device may include a photographing unit to photograph an object, and a sensing unit to sense the mobile device and/or a user of the mobile device. The functional unit 260 may be a unit to perform a process including a motion detection process and a user identification process, which are described above and also will be described later. The sensing unit may include a first sensor unit to sense a motion state of the mobile device, a second sensor unit to sense an environmental state, for example, brightness/darkness, of the mobile device, and a third sensor unit to sense a state of the user of the mobile device. However, the mobile device is not limited thereto. The functional unit 260 may further include a medical detector to detect a medical state of the user of the mobile device.

The first sensor unit of the functional unit 260 may include sensors including, for example, gyro sensors, to detect a motion state of the mobile device. The first sensor unit may sense a movement, that is, the motion state, of the mobile device when the user of the mobile device moves, walks, or runs, or when the mobile device moves or rotates according to a movement of an apparatus in which the user and the mobile device may be disposed. The control unit 210 of the mobile device receives signals output from the functional unit 250 of the mobile device. An output of the first sensor unit of the function unit 260 may be represented by the pattern P1 of FIG. 10A.

When the mobile device is in a non-operational mode, such as a deactivation mode, a sleep mode, a power saving mode, and a turn-off mode, the mobile device may be partially activated, that is, the functional unit 260 and the control unit 210, for example, of the mobile device may operate to monitor (or detect) the motion state of the mobile device during the non-operational mode. When the user wants to change the non-operational mode to an operational mode, such as a normal mode, a user hand may hold the mobile device and then may place the mobile device in front of a user face within a length of a user arm from the user face when the user is in a stationary state or in a movable state, or the user or the user hand may touch the mobile device within the length of the user arm when the mobile device is in the stationary state and is disposed on a table, for example, which is not in the movable state. The mobile device may recognize a moment in which the mobile device is about to be changed from the non-operational mode to the operational mode according to a movement pattern, that is, the motion state of the mobile device.

Here, the operational mode may include a partial operational mode and a full operational mode. In the partial operational mode, the user may be allowed to access one of full functions of the normal mode of the mobile device without the security check process requiring the password. In the partial operational mode, the one of the full functions of the normal mode may be a photographing function to photograph an object and display the photographed object on a screen of the display unit 240 of FIG. 2. In the full operational mode including the normal mode, the user may be allowed to access all the functions of the mobile device by performing the security check process when a condition is not met or without performing the security process when the condition is met, as described above.

The mobile device may periodically monitor (or detect) the state of the mobile device. For example, the mobile device may repeatedly monitor the state of the mobile device during the non-operational mode and/or during the operational mode according to a user or design preference. When the mobile device monitors the state of the mobile device during the operational mode, the control unit 210 may extern a time period after which a mode of the mobile device is changed from the operational mode to the non-operational mode, for example, the power saving mode, according to the motion state of the mobile device and a photographed image of the functional unit 260, which will be described later. Therefore, if the mobile device is set to change the operational mode to the non-operational mode five minutes after no input from the user to the mobile device, the five minutes may be changed to seven minutes, for example, by extending two more minutes, according to a determination of the control unit 210 by using sensed data including the motion state of the mobile device and/or the photographed image of the functional unit 260, for example.

Although FIGS. 10A through 10D illustrates the motion state of the mobile device when the mobile device is changed from the operational mode to the non- operational mode, the present disclosure is not limited thereto. The motion state of the mobile device may be detected during the operational mode periodically, for example, every a tenth second period. The motion state of the mobile device may be detected during the non-operational mode periodically, for example, every a half second period. However, the above-described a tenth second period and a half second period are examples, and thus the periods may vary according to a user or design preference or according to a user habit, for example, a movement pattern, with the mobile device.

Referring back to FIG. 10A, the sensing unit senses the motion state of the mobile device and outputs signals to the control unit 210. The signals correspond to the pattern P1. When the pattern P1 is changed from a first certain amplitude to a second certain amplitude, for example, a zero level, at a time T1, the control unit 260 may determine that the user is about to access the mobile device at a moment S1. According to experiments, the user holds the mobile device at least in a relatively stationary state or a relatively stable state at least at the time T1, to use the mobile device at the moment S1, and the holding state of the mobile device by the user is represented by the change in the amplitude of the pattern P1.

At the moment S1, the control unit 210 determines that the mobile device is disposed in front of the user face within the length of the user arm, and then activates the functional unit 260 to photograph an object which is a person disposed in front of the mobile device. The control unit 210 may analyze the photographed person according to a comparison method of comparing a photographed object with an image of an authorized user, which may be stored in a memory of the mobile device, and then determine whether the person, that is, the photographed object, is the authorized user. The comparison method may be a facial recognition method. If the control unit 210 recognizes the person as the authorized user, the control unit 210 controls the mobile device to operate the normal mode without performing the security checking process. If the control unit 210 does not recognize the person as the authorized user, the control unit 2310 performs the security checking process requiring the person or the user to enter the password to access the normal mode of the mobile device.

If the image of the authorized image is stored in a memory of an external device, the control unit activates the network interface 220 to communicate with the external device and to send the photographed image to the external device. When the external device determines whether the received image is identical to the stored image of the authorized user, the external device outputs the determination to the network interface 220 of the mobile device. According to the received determination from the external device, the control units determines whether to perform the security checking process before allowing the person or user to access the normal mode of the mobile device.

The time T1 may be same as the moment S1. However, there may be a time lag between the moment S1 and the time T1. The time lag may be a certain short period of time, for example, a quarter second. The control unit 210 analyzes the pattern P1 to see a first pattern before the time T1 and a second pattern at the time T1. The control unit 210 may recognize a significant amplitude change or a different pattern change in the pattern S1, and then may determine that the user is in a state to change the non-operational mode to the operational mode or that the mobile device is touched by the user to operate the normal mode.

At the moment S1, the user may select an icon corresponding to the partial operational mode, for example, a camera icon to photograph an object, which may not require the security check process when the mobile device is changed from the non-operational mode to the operational mode. In this case, the control unit 210 may operate the partial operational mode. However, the control unit 210 may extract an image from the photographed object and may compare the extracted image with the image of the authorized user. If the control unit 210 recognizes the extracted image to correspond to the image of the authorized user, the control unit 210 may allow the user to access the normal mode of the mobile device without the security check process. The photographing unit may include a first photographing unit to photograph the object during the partial operational mode and a second photographing unit to photograph a person in front of the mobile device to determine whether the person is the authorized user. The control unit 210 may control the first photographing unit and the second photographing unit to perform the above-described operations. The photographed image of the first photographing unit may be displayed on the display unit 240. However, the photographed image of the second photographing unit may not be displayed on the display unit 240. However, the present disclosure is not limited thereto. The photographed image of the second photographing unit may be displayed on the display unit 240, or a symbol representing the photographed image of the second photographing unit may be displayed on the display unit.

Figure 10B:
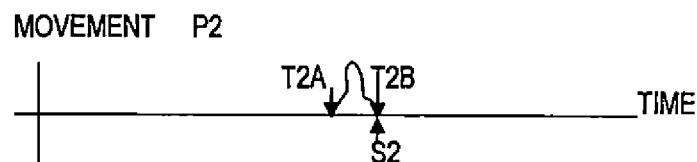

FIG. 10B illustrates a pattern P2 of the mobile device. The mobile device is in a stationary state, that is, a not-moving state, until a time T2A, is changed from the stationary state to a moving state between the time T2A and a time T2B, and then is changed to a stop state at the time T2B. The control unit 210 determines that the user touches (or picks up) the mobile device and/or is about to use the mobile device. Accordingly, the control unit 210 may allow the user to use the normal mode of the mobile device according to a detection of a movement pattern of the mobile device and a user identification process. According to experiments, the user touches the mobile device, which is in a stationary state or a stable state, at least between the time T2A and the time T2B, to use the mobile device at the moment S2, and the touching (or holding) state of the mobile device by the user is represented by the change in the amplitudes of the pattern P2.

Figure 10C:
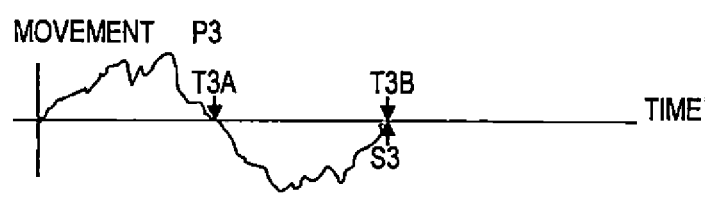

FIG. 10C illustrates a pattern P3 of the mobile device. The mobile device may move and/or rotate in different directions. Here, differently from FIG. 10A ignoring the crossing portions of the amplitudes with respect to the time axis, FIG. 10C illustrates a crossing portion of the amplitudes with respect to the time axis. A portion of the pattern P3 just before a time T3A and/or a portion of the movement pattern P3 just after the time T3A may be different from a portion of the movement pattern P3 at a time T3B. The control unit 210 analyzes the portions of the pattern P3 and determines that the mobile device is in front of the user face at the time T3B according to the detected pattern P3 of the mobile device. And thus, the control unit 210 may perform the user identification process by activating the photographing unit to photograph a person, and may determine whether the person is the authorized user. The control unit 210 may extract a portion of the photographed image, and then may compare the extracted portion to the image of the authorized user. According to experiments, the user holds the mobile device at least in a relatively stationary state or a relatively stable state at least at the time T3B, to use the mobile device at the moment S3, and the holding state of the mobile device by the user is represented by the change in the amplitudes of the pattern P3

Figure 10D:
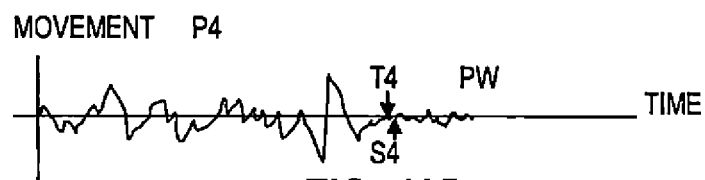

FIG. 10D illustrates a pattern P4 of the mobile device. The mobile device may repeatedly move and/or rotate in different directions. Here, differently from FIG. 10A ignoring the crossing portions of the amplitudes with respect to the time axis, FIG. 10D illustrates a number of crossing portions of the amplitudes with respect to the time axis in the movement pattern P4. A number of the crossing portions of the movement pattern P4 before a time T4A may be different from a portion of the pattern P4 at a time T4B. Amplitudes of the pattern P4 may be different from the amplitudes of the patterns P1, P2, and P3. The user and the mobile device may be disposed inside a moving apparatus, for example, a vehicle or a train. The user holding the mobile device may ride a bicycle. However, the present disclosure is not limited thereto. The user having the mobile phone may jog along a road. According to experiments, the user holds or touches the mobile device at least in a relatively stationary state or a relatively stable state at least at the time T4, to use the mobile device at the moment S4, and the holding or touching state of the mobile device by the user is represented by the change in the amplitudes of the pattern P4.

The control unit 210 analyzes the pattern P4 and determines that the mobile device is disposed in front of the user face at the time T4B according to the detected pattern P4 of the mobile device. And thus, the control unit 210 may perform the user identification process by activating the photographing unit to photograph a person in front of the mobile device, and may determine whether the person is the authorized user. The control unit 210 may extract a portion of the photographed image, and then may compare the extracted portion to the image of the authorized user.

When the user having the mobile device moves, the mobile device may receive a phone call. The user may stop to enter the password to the mobile device to answer the phone call. However, the mobile device may detect the motion of the mobile device, detect the pattern of the mobile device, detect a characteristic of the pattern, and then determine that the user is to use the mobile phone, is disposed in front of the display unit 240 of the mobile device, and/or is about to answer the phone call. Since the mobile device recognizes a person holding or touching the mobile phone as the authorized user of the mobile device, the authorized user may easily answer the phone call without the security check process of entering the password which is set in the mobile device to access the normal mode of the mobile device.

Although FIGS. 10A through 10D respectively illustrate the patterns P1 through P4, the present disclosure is not limited thereto. Another movement pattern of the mobile device may be used to perform a movement pattern detection process and a user identification process as described above, as long as the another pattern of the mobile device corresponds to a case in which a person holds or touches the mobile device and/or is disposed in front of the mobile device to use the mobile device or to use the normal mode of the mobile device.

According to an embodiment, the control unit 210 of the mobile device may not activate the photographing unit until the detected movement pattern matches at least one of reference patterns which represent that the user is to use the mobile device, or until the portion of the detected movement pattern approaches to a certain level representing a situation in which the user is to use the mobile device. That is, the control unit 210 of the mobile device may activate the photographing unit when a predetermined pattern is detected or when a predetermined portion of a pattern is detected. However, when the user identification fails, that is, when the person holding and touching the mobile device is not the authorized user, the control unit 210 of the mobile device may maintain the non-operational mode without performing the security check process or the person has to select a key of the mobile device to enter the password in the security check process to use the normal mode of the mobile device.

The second sensing unit may detect brightness around the mobile device. If a brightness level is lower than a predetermined level, the control unit 210 may not activate the photographing unit since the environment state of the mobile device is not sufficient to operate the photographing unit to photograph the person or object. If the brightness level is not lower than the predetermined level, the control unit 210 may activate the photographing unit since the environment state of the mobile device is sufficient to control the photographing unit to photograph the person or object The detection of the brightness by the second sensing unit may prevent an unnecessary activation of the photographing unit in the lower level of the brightness around the mobile device. In this case, the control unit 210 may perform the security check process or maintain the non-operational mode. When the non-operational mode is maintained, the control unit 210 may perform the security check process when a user selects a key to access the normal mode of the mobile device.

The third sensing unit may be usable to detect any signal from the user in the user identification process. Although the photographing unit is used for the user identification process by photographing the person in front of the mobile device, the third sensing unit may be used for the user identification process instead of the photographing unit if the user identification process uses the signal from the user rather than using the photographed image, if the environmental state of the mobile device is not sufficient to photograph an object, or if the photographing unit is unusable or malfunctions. The signal from the user may be a signal from a user's own additional device, such as a user watch. The user's own additional device may send to the mobile device the signal representing that the user is the authorized user of the mobile device. In this case, the mobile device is set to communicate with the third sensing unit and to recognize the signal representing the authorized user of the mobile device. The third sensing unit and the network interface 220 may be a single unit.

According to an embodiment, the control unit 210 of the mobile device may selectively activate one or more units of the mobile device illustrated with reference to FIGS. 1 through 9 according to a time period or according to the motion of the mobile device to perform an internal process including a motion detection process and a user identification process. And thus, the security checking process is selectively applied to allow the user to access the normal mode of the mobile device.

Figure 11:
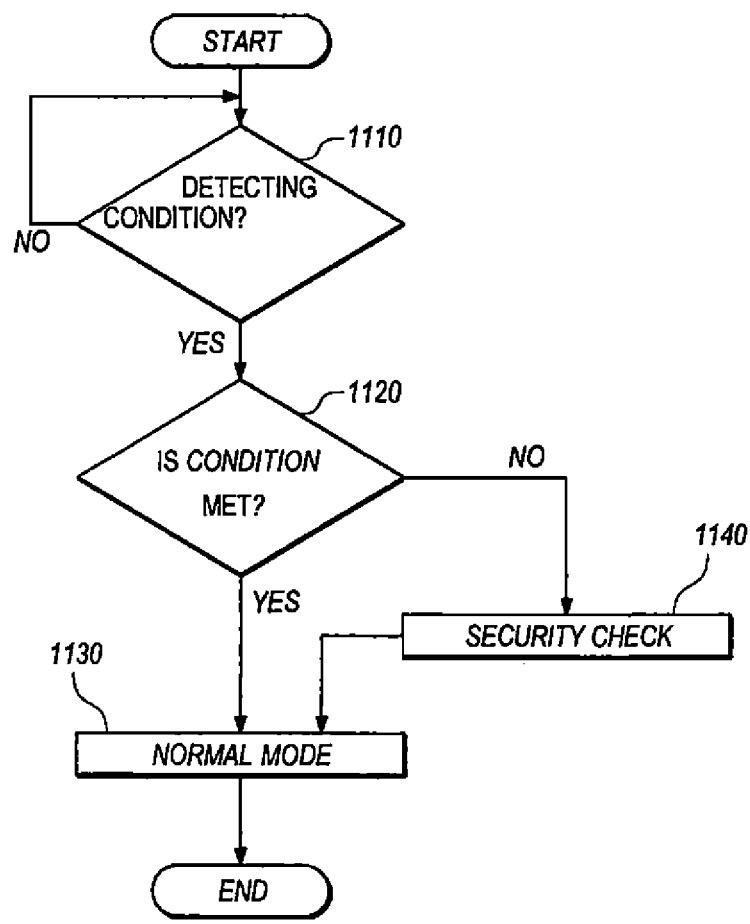
FIG. 11 is a flowchart illustrating a method of selectively applying a security check process in a mobile device according to an embodiment of the present inventive concept.

FIG. 11 illustrates a method of selectively applying a security check process in the mobile device of FIG. 2 according to an embodiment of the present inventive concept.

At operation 1110, the control unit 210 of the mobile device may detect a condition of the mobile device. The condition may include a connection condition in which the mobile device is connected to an external device, an area condition in which the mobile device and/or the external device are disposed in an area, a time condition in which the mobile device is to operate at a time, a signal condition in which the mobile device receives a predetermined signal from the external device, a movement pattern and user identification condition in which the mobile device detects a movement pattern and performs a user identification according to the movement pattern, and any combination thereof. Hereinafter, the above-described conditions may be referred to as an internal process which is performed in the mobile device with or without informing the user of the internal process. The internal process may be informed to the user through the display unit 240 of the mobile device. The informing of the internal process to the user may include displaying an image or message on the display unit 240 and/or generating an audio signal through the audio unit 250 of the mobile device.

At operation 1120, the control unit 210 of the mobile device may determine whether the condition is met. If the condition is met, the mobile device does not require a security check process and allows the user to access the normal mode of the mobile device at operation 1130. However, the condition is not met, the mobile device requires the security check process at operation 1140 before allowing the user to access the normal of the mobile device at operation 1130.

Figure 12:
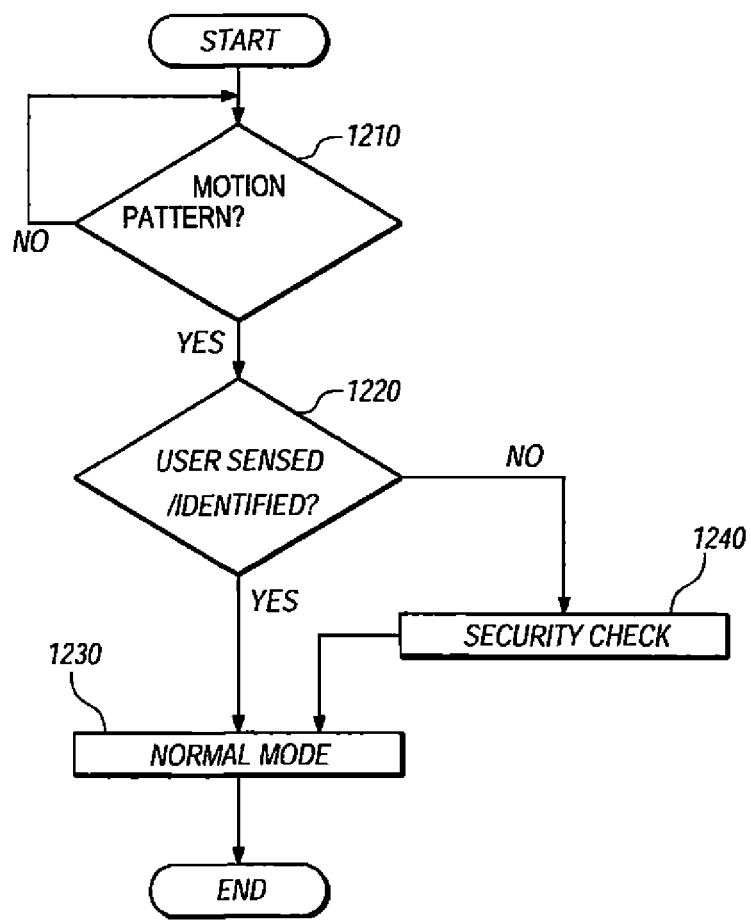
FIG. 12 is a flowchart illustrating a method of selectively applying a security check process in a mobile device according to an embodiment of the present inventive concept.

FIG. 12 illustrates a method of selectively applying a security check process in the mobile device of FIG. 2 according to an embodiment of the present inventive concept Referring to FIGS. 10A through 12, the motion of the mobile device is detected, the movement pattern of the mobile device is detected, and then the control unit 210 of the mobile device determines whether the user holds (or picks up) or touches the mobile device and is to use the mobile device according to the detected movement pattern. That is, at operation 1210, the control unit 210 may determines whether one of the detected movement patterns matches a predetermined reference pattern and/or whether a portion of the detected movement patterns matches a predetermined portion of a predetermined reference pattern.

At operation 1220, when the control unit 210 may recognize that the user holds or touches the mobile device or is in front of the mobile device, to use the mobile device, by determining that one of the detected movement patterns matches at least one of reference pattern and/or by determining that a portion of the detected movement patterns matches at least one of reference portions of the reference patterns, the control unit 210 may perform the user sensing and/or identification process to identify the person who holds or touches the mobile device or is in front of the mobile device, to use the mobile device. If the person is the authorized user, the mobile device changes the mobile device from the non-operational mode to the operational mode and/or allows the user to access the normal mode of the mobile device. The mobile device may further include a storage memory as the functional unit 260 to store the reference patterns and the reference portions of the reference patterns.

The control unit 210 may control the display unit 240 to display an image (or message) which corresponds to information on the above-described process or the photographed image. However, the control unit 210 may control the display unit 240 not to display any image or message which corresponds to the information on the above-described process or the photographed image, so that a power consumption is reduced. In this case, a user may not recognize the above-described process internally performed by the control unit 210 of the mobile device.

Therefore, the mobile device is able to recognize a user who wants to use the mobile device or wants to change the non-operational mode to the operational mode, with or without informing the user of an internal process (that is, the above-described process) of the mobile device. Therefore, the user may conveniently use the mobile device without entering the password to the mobile device when the condition is met.

As described above, the mobile device may operate the normal mode of the mobile device without performing the security check process, according to the motion detection and the photographed image.

As described above, the mobile device may operate the normal mode of the mobile device according to the photographed object and the sensed motion of the functional unit, without a user input to the security check process.

As described above, the mobile device may operate the normal mode of the mobile device by internally performing the motion and image sensing process.

As described above, the mobile device may change a non-operational mode to an operation mode corresponding to the normal mode by performing an internal process corresponding to the motion and image sensing process without informing the user of the internal process.

As described above, the mobile device may extend a time period of the operational mode without a user input according to the operations of the functional unit of the mobile device.

As described above, the mobile device may change a non-operational mode to an operation mode corresponding to the normal mode without a user input to the mobile device.

As described above, the user may use one hand to hold or touch the mobile device and the user may not use the other hand to access the normal mode of the mobile device since the mobile device internally perform the motion and image sensing process. In this case, the mobile device does not require the other hand to select a key of the mobile device or to operate the security check process to enter the password to the mobile device in the security mode of the mobile device. Even if the user is a handicapped person, the user may access the normal mode of the mobile device by touching the mobile device by using any portion of the user body.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As illustrated above, a mobile device can be set in a security mode and a safe zone may be set in the security mode so that the mobile device does not require a user to enter a password when a current condition matches a condition of the safe zone.

The conditional of the safe zone may include a connection condition in which an external device is connected to the mobile device according to a wireless or wired method, an area condition in which the mobile device and/or the external device are disposed in an area, a time condition in which the mobile device is to operate at a time, a signal condition in which the mobile device receives a certain signal from an external device, and an internal process condition in which the mobile device internally performs an internal process corresponding to the motion detection and user identification process, without informing the user of the performance of the internal process.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A mobile device, comprising:
    a panel to display a menu image and to receive a password;
    a network interface to detect an external device;
    a functional unit to sense a motion of the mobile device and to photograph a user; and
    a control unit:
    to control the panel, the network interface, and the functional unit;
    to unlock the mobile device according to a user identification process of photographing the user to identify an authorized user in response to the sensed motion when the mobile device is in a time condition; and
    to unlock the mobile device according to the password in response to the sensed motion when the mobile device is not in the time condition.

2. The mobile device of claim 1, wherein:
    the user identification process further comprises determining whether the photographed user represents the authorized user; and
    the control unit further comprises unlocking the mobile device according to the determination indicating that the photographed user represents the authorized user.

3. The mobile device of claim 1, wherein:
    the user identification process further comprises determining whether the photographed user represents the authorized user; and
    the control unit further comprises unlocking the mobile device according to the password when the photographed user does not represent the authorized user.

4. The mobile device of claim 1, wherein:
    the control unit further performs a second user identification process which comprises detecting the external device and determining whether the detected external device represents the authorized user; and
    the control unit further comprises unlocking the mobile device according to the second user identification process indicating that the detected external device represents the authorized user.

5. The mobile device of claim 1, wherein:
    the control unit further performs a second user identification process which comprises detecting the external device and determining whether the detected external device represents the authorized user; and
    the control unit further comprises unlocking the mobile device according to the password when the determination of the second user identification process indicates that the detected external device does not represent the authorized user.

6. The mobile device of claim 1, wherein:
    the control unit further performs a second user identification process comprising communicating with the detected external device through a network and determining whether the communication represents the authorized user; and
    the control unit further comprises unlocking the mobile device according to the determination of the second user identification process indicating that the communication represents the authorized user.

7. The mobile device of claim 1, wherein:
    the control unit further performs a second user identification process which comprises communicating with the detected external device through a network and determining whether the communication represents the authorized user; and.
    the control unit further comprises unlocking the mobile device according to the password when the determination of the second user identification process indicates that the communication does not represent the authorized user.

8. The mobile device of claim 1, wherein the time condition comprises a period of time.

9. The mobile device of claim 1, wherein
    the user identification process further comprises determining whether the photographed user represents the authorized user;
    the control unit further comprises performing a second user identification process when a first determination indicates that the photographed user does not represents the authorized user;
    the second user identification process comprises detecting the external device and determining whether the detected external device represents the authorized user; and
    the control unit further comprises unlocking the mobile device according to the determination of the second user identification process indicating that the detected external device represents the authorized user.

10. The mobile device of claim 1, wherein
    the user identification process further comprises determining whether the photographed user represents the authorized user;
    the control unit further comprises performing a second user identification process when a first determination indicates that the photographed user does not represent the authorized user;
    the second user identification process comprises detecting the external device and determining whether the detected external device represents the authorized user; and
    the control unit further comprises unlocking the mobile device according to the password when the determination of the second user identification process indicates that the detected external device does not represent the authorized user.

11. The mobile device of claim 1, wherein
    the control unit further performs a second user identification process which comprises detecting the external device and determining whether the detected external device represents the authorized user; and the control unit further comprises unlocking the mobile device according to at least one of the user identification process and the second user identification.

12. The mobile device of claim 1, wherein
the control unit further performs a second user identification process which comprises detecting the external device and determining whether the detected external device represents the authorized user; and
the control unit further comprises unlocking the mobile device according to the password when the user identification process and the second user identification process indicate that the photographed user and the detected external device do not represent the authorized user.

13. The mobile device of claim 1, wherein the motion comprises a moving state and a stationary state indicating that a user is in front of the panel for a period of time at an end of the moving state, and the functional unit senses the stationary state for the period of time as the sensed motion.

14. The mobile device of claim 1, wherein the panel displays a user menu for the user identification process at a user finger unreachable area, and the control unit controls the panel to display the user menu at a user finger reachable area such that a finger of a hand holding the mobile device can reach the user menu.

15. The mobile device of claim 1, wherein the panel comprises a user finger unreachable area and a user finger reachable area defined by a line, and the control unit controls the panel to display a user menu at the user finger reachable area defined by the line.

16. The mobile device of claim 1, wherein the control unit controls the panel to display a symbol representing the user identification process.

17. The mobile device of claim 1, wherein:
the panel comprises a user finger reachable area and a user finger unreachable area; and
the control unit further controls the panel to display a security check process of receiving the password at the user finger reachable area such that the user finger of a user hand holding the mobile device reaches the security check process.

18. The mobile device of claim 1, wherein:
the panel displays a line defining a user finger reachable area and a user finger unreachable area; and
the control unit further controls the panel to display a security check process of receiving the password at the user finger reachable area such that the user finger of a user hand holding the mobile device inputs the password.

19. The mobile device of claim 1, further comprising a sensor to detect a brightness,
wherein unlocking the mobile device according to the user identification process further comprises activating the user identification process according to a level of the detected brightness in response to the detected motion to unlock the mobile device according to the user identification process.

20. The mobile device of claim 1, further comprising a sensor to detect a brightness,
wherein unlocking the mobile device further comprises:
not activating the user identification process according to a level of the detected brightness in response to the detected motion; and
unlocking the mobile device according to the password.

* * * * *